United States Patent
Cogley et al.

(10) Patent No.: US 12,190,048 B2
(45) Date of Patent: Jan. 7, 2025

(54) CONTEXT ADAPTIVE WRITING ASSISTANT

(71) Applicant: Microsoft Technology Licensing, LLC, Redmond, WA (US)

(72) Inventors: James Cogley, Dublin (IE); Aman Singh, Dublin (IE); Enrico Cadoni, Dublin (IE); Shashank Shekhar Gupta, Dublin (IE)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/986,444

(22) Filed: Nov. 14, 2022

(65) Prior Publication Data

US 2024/0160836 A1    May 16, 2024

(51) Int. Cl.
*G06F 40/166*    (2020.01)

(52) U.S. Cl.
CPC .................................. *G06F 40/166* (2020.01)

(58) Field of Classification Search
CPC .................................................... G06F 40/166
See application file for complete search history.

(56) References Cited

U.S. PATENT DOCUMENTS

| | | | | |
|---|---|---|---|---|
| 5,521,816 A | * | 5/1996 | Roche et al. | G06F 17/27 |
| 5,537,317 A | * | 7/1996 | Schabes et al. | G06F 17/27 |
| 5,845,306 A | * | 12/1998 | Schabes et al. | G06F 3/14 |
| 10,936,813 B1 | * | 3/2021 | Gupta | G06F 40/232 |
| 2011/0202836 A1 | * | 8/2011 | Badger et al. | G06F 3/048 |
| 2017/0222892 A1 | * | 8/2017 | Brown et al. | H04L 43/045 |
| 2020/0278987 A1 | * | 9/2020 | Liu et al. | G06F 16/3322 |
| 2021/0397787 A1 | * | 12/2021 | Nagvenkar et al. | G06F 40/253 |
| 2023/0297771 A1 | * | 9/2023 | Peleg et al. | G06F 40/186 |

FOREIGN PATENT DOCUMENTS

| | | |
|---|---|---|
| WO | 2017112423 A1 | 6/2017 |
| WO | 2018236524 A1 | 12/2018 |
| WO | 2022015730 A1 | 1/2022 |

OTHER PUBLICATIONS

International Search Report and Written Opinion received for PCT Application No. PCT/US2023/033775, Jan. 17, 2024, 13 pages.

* cited by examiner

*Primary Examiner* — James J Debrow
(74) *Attorney, Agent, or Firm* — NovoTechIP International PLLC

(57) ABSTRACT

A data processing system implements receiving textual content from a first application on a first client device associated with a first user for analysis by a context adaptive writing assistant configured to provide suggestions for improving the textual content, obtaining contextual information indicative of a level of formality of the textual content; and categorizing the textual content as being associated with a first level of formality selected from a plurality of levels of formality. The system is further implements analyzing the textual content to identify one or more suggested improvements to the textual content; selecting a subset of suggested improvements from the one or more suggested improvements to the textual content to the first user based on the first level of formality associated with the textual content; sending the subset of suggested improvements to the first client device; and causing the first client device to display the subset of suggested improvements.

18 Claims, 19 Drawing Sheets

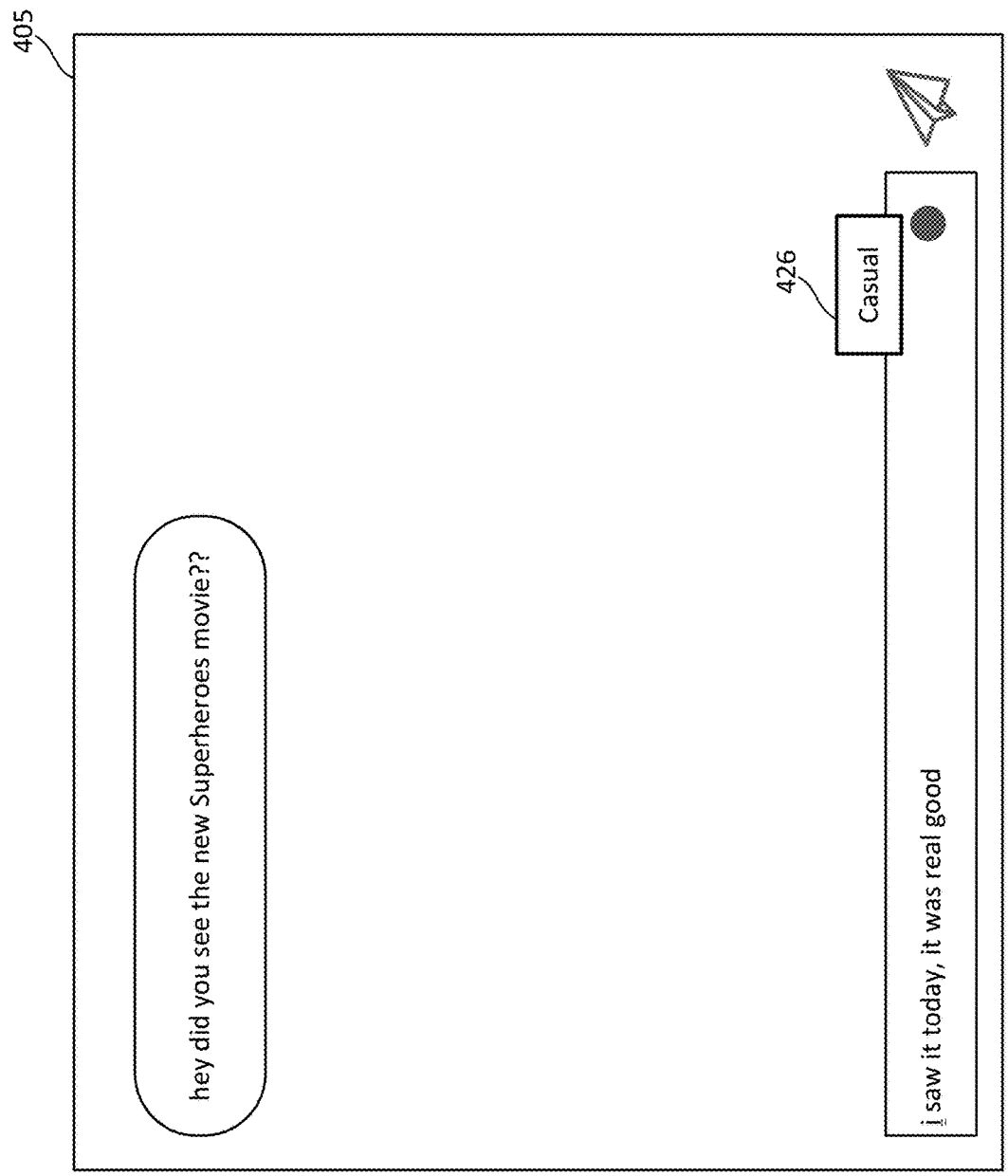

415

Headline <click to edit a headline to your slide>

Image <click to edit an image to your slide>

As I step out of bed, the pain shoots through my foot and up my leg like it has every morning since "the game." That night, I was tackled by a r... 212 pounds landing decid... ediate. By the next nigt w... e game from the previous Spelling:
night
nigh
nit Ignore ...    Configure Writing Assistant

CONTEXT ADAPTIVE WRITING ASSISTANT

BACKGROUND

Various automated tools exist for proofreading textual content of electronic documents and for providing suggestions to improve the grammar, spelling, vocabulary, punctuation, or other aspects of the textual content. However, these tools are typically designed for more formal writing style and may not be appropriate or desired by users for more informal communications. The recommendations provided by these tools can become intrusive, interrupt the workflow, and degrade the user experience when recommendations are provided in situations where they are not deemed to be helpful by the user. Hence, there is a need for improved systems and methods that provide a technical solution for implementing a context adaptive writing assistant that adapts the recommendations provided to the user based on the context in which the electronic context is being drafted.

SUMMARY

An example data processing system according to the disclosure may include a processor and a machine-readable medium storing executable instructions. The instructions when executed cause the processor to perform operations including receiving textual content from a first application on a first client device associated with a first user; obtaining contextual information indicative of a level of formality of the textual content; categorizing the textual content as being associated with a first level of formality selected from a plurality of levels of formality based on the contextual information by providing the textual content and the contextual information as an input to a first machine learning model, the first machine learning model being trained to analyze the textual content and the contextual information to predict the level of formality associated with the textual content and to output an indication of the predicted level of formality; analyzing the textual content to identify one or more suggested improvements to the textual content; selecting a subset of suggested improvements from the one or more suggested improvements to the textual content to the first user based on the first level of formality associated with the textual content; sending the subset of suggested improvements to the first client device; and causing the first client device to display the subset of suggested improvements in the first application on the first client device.

An example data processing system according to the disclosure may include a processor and a machine-readable medium storing executable instructions. The instructions when executed cause the processor to perform operations including receiving textual content from a first application of the first client device; sending the textual content to a context adaptive writing assistant for analysis; receiving suggested improvements to the textual content from the context adaptive writing assistant and a first indication that the context adaptive writing assistant is operating in a first mode associated with a first level of formality associated with the textual content; causing the first client device to display the indication that the context adaptive writing assistant is operating in the first mode associated with the first level of formality; and causing the first client device to display the suggested improvements to the textual content in the first application.

An example method implemented in a data processing system for providing suggestions for improving textual content includes receiving the textual content from a first application on a first client device associated with a first user; obtaining contextual information indicative of a level of formality of the textual content; categorizing the textual content as being associated with a first level of formality selected from a plurality of levels of formality based on the contextual information by providing the textual content and the contextual information as an input to a first machine learning model, the first machine learning model being trained to analyze the textual content and the contextual information to predict the level of formality associated with the textual content and to output an indication of the predicted level of formality; analyzing the textual content to identify one or more suggested improvements to the textual content; selecting a subset of suggested improvements from the one or more suggested improvements to the textual content to the first user based on the first level of formality associated with the textual content; sending the subset of suggested improvements to the first client device; and causing the first client device to display the subset of suggested improvements in the first application on the first client device.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The drawing figures depict one or more implementations in accord with the present teachings, by way of example only, not by way of limitation. In the figures, like reference numerals refer to the same or similar elements. Furthermore, it should be understood that the drawings are not necessarily to scale.

FIGS. 4A-4K are diagrams of example user interfaces showing examples of the adaptive techniques disclosed herein.

DETAILED DESCRIPTION

Techniques for providing a context adaptive writing assistant are provided. These techniques address the technical problems associated with current writing assistant and proofing tools. Current writing assistants are designed for formal communications and are often inappropriate for more informal communications. The recommendations provided by current writing assistants often become intrusive for informal communications where users are not as concerned with ensuring the correctness of the spelling, grammar, punctuation, and other aspects of the textual content. These recommendations can interrupt the user workflow and degrade user experience when the user does not deem such recommendations helpful.

The techniques disclosed herein provide a context adaptive writing assistant that determines a context in which an electronic document is being written and adjusts the behavior of the context adaptive writing assistant accordingly. The contextual information considered by the context adaptive writing assistant may include but is not limited to the type of textual content, the target audience for the textual content, the relationship between the author and the intended audience, document-specific behavior of the author, typical behavior of the author, and/or other such information. The context adaptive writing assistant is configured to collect context information from numerous data sources and analyze this context information to determine which features of the context adaptive writing assistant should be enabled and which should be disabled. Some implementations include a machine learning model configured to analyze the context information associated with textual content being drafted by a user and to classify the level of formality of the textual content. The output of the classifier model is used to determine which features of the context adaptive writing assistant should be enabled or disabled to customize the behavior of context adaptive writing assistant and provide recommendations that are appropriate for that particular use case. A technical benefit of this approach is that the user experience and workflow are improved by providing recommendations for improving the textual content that are appropriate for that particular use case. These and other technical benefits of the techniques disclosed herein will be evident from the discussion of the example implementations that follow.

Figure 1:
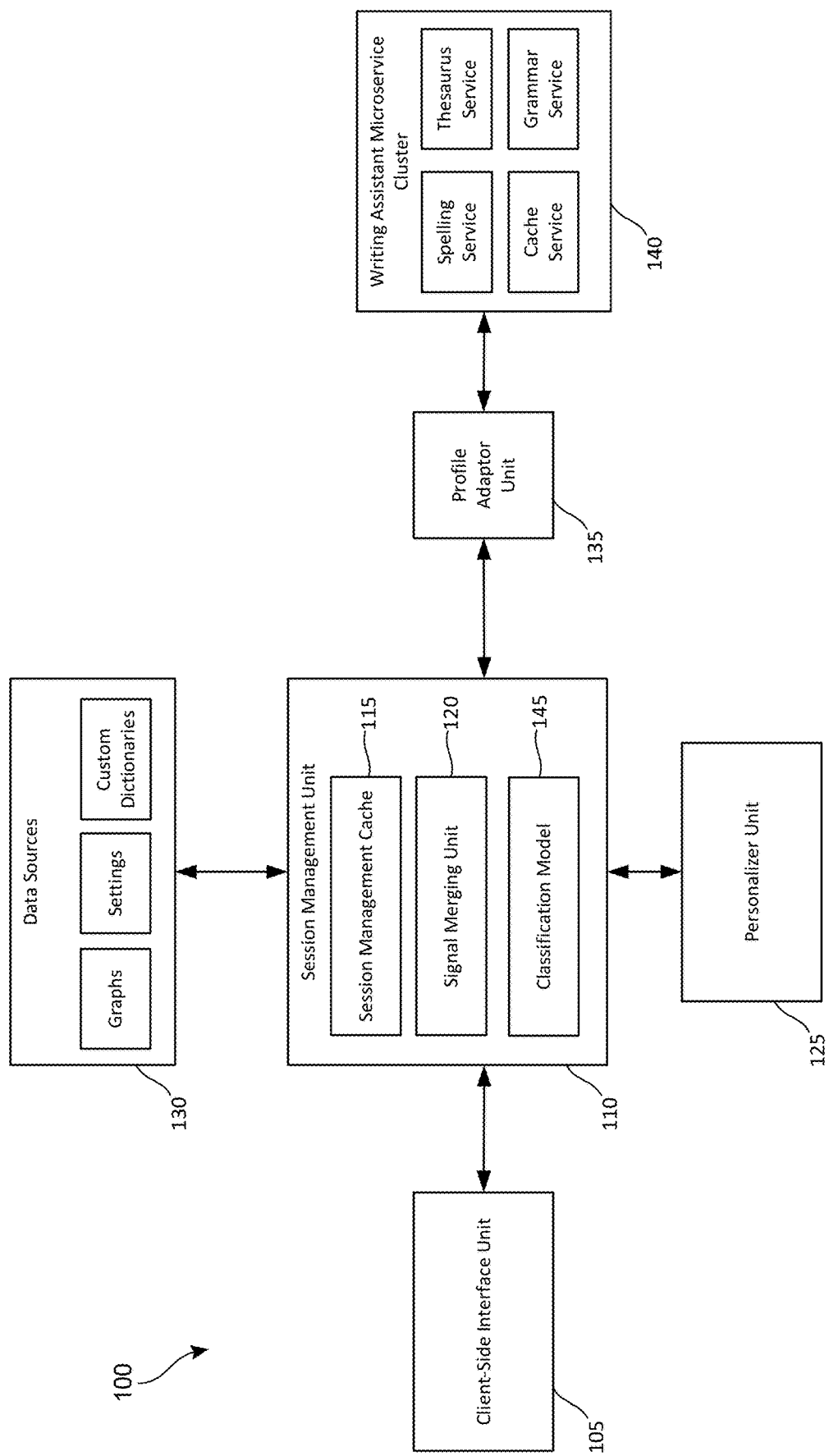
FIG. 1 is a diagram showing an example computing environment in which the techniques disclosed herein for providing a context adaptive writing assistant may be implemented.

FIG. 1 is a diagram showing an example computing environment 100 in which the techniques disclosed herein for providing a context adaptive writing assistant may be implemented. The computing environment 100 shows various elements associated with an implementation of a context adaptive writing assistant which includes a client-side interface unit 105, a session management unit 110, a personalizer unit 125, data sources 130, a profile adaptor unit 135, and an writing assistant microservice cluster 140. The session management unit 110 includes a session management cache 115, a signal merging unit 120, and a classification model 145. The client-side interface unit 105 is implemented on the client device of a user. The session management unit 110, the personalizer unit 125, the data sources 130, the profile adaptor unit 135, and the writing assistant microservice cluster 140 are implemented by one or more cloud-based services accessible to the client devices of users via a network connection.

The client-side interface unit 105 is implemented on the client device of a user to provide support for writing assistant services in one or more native applications installed on the client device. As a user creates or edits textual content in an application on the client device, the application provides at least a portion of this textual content to the client-side support unit 105 for analysis by the context adaptive writing assistant services. The client-side interface unit 105 sends the textual content to the session management unit 110 via a network connection. The session management unit 110 coordinates the analysis of the textual content and provides suggested improvements to the textual content (if any) to the client-side interface unit 105. The suggested improvements may include but are not limited to spelling suggestions, punctuation suggestions, grammatical suggestions, capitalization suggestions, alternate stylistic suggestions, and/or other types of suggestions for improving the textual content. The textual content can be textual content from a word processing document, a presentation, a text message, an email message, a chat message, and/or other type of textual content. The types of suggestions provided by the context adaptive writing assistant depend at least in part on the type of textual content being authored. The context adaptive writing assistant services can be provided to a variety of different types of applications on the client device, such as but not limited to word processing applications, collaboration platforms, messaging applications, web browsers, presentation design applications, and/or other types of applications in which the textual content may be authored. The client-side interface unit 105 provides an interface for these applications to communicate with the session management unit.

The suggested improvements information provided by the session management unit 110 includes information identifying a word, phrase, sentence, or other element of the textual content and a suggested improvement to the corresponding word, phrase, sentence, or other element. Multiple suggested improvements and/or types of suggested improvements may be provided by the context adaptive writing assistant for the textual content. The client-side interface unit 105 provides functionality for presenting these suggested improvements on the user interface of the application in which the textual content was being authored on the client device. The user interface may render representations of the suggested improvements in different ways. In some implementations, the corresponding section of textual content associated with a suggested improvement is underlined, highlighted, or otherwise emphasized to provide a visual indication to the user that there is an associated suggested improvement. The positional information included with the suggested improvements is used to ensure that the correct portion of the textual content is emphasized to the user. The user may then interact with the emphasized text to cause the suggested improvements to be displayed in some implementations. A technical benefit of this approach is that it reduces clutter on the user interface of the application by only displaying the suggested improvements with which the user interacts.

The session management unit 110 establishes a user session in response to a request from the client-side interface unit 105. A user session, as used herein, refers to a period of activity when the user is authoring or editing content in the application which supports the context adaptive writing assistant. The session management unit 110 may analyze textual content authored or edited by the user multiple times during the user session and determine which context adaptive writing assistant functions should be provided to the user based on context information collected during the user session. The context information is discarded once the user session has been completed. In some implementations, the user session is determined to be terminated when the user exits the application in which the textual content was being authored or edited, or when the user closes an electronic document containing the textual content which the user was authoring or editing.

The session management unit 110 is configured to analyze the textual content to determine suggested improvements can be provided to the user for improving the textual content. The session management unit 110 is also configured to determine which of the suggested improvements (if any) should be presented to the user based on the context information obtained by the session management unit 110.

The session management unit 110 collects context information from various sources and stores the context information in the session management cache 115. The session management cache 115 is a persistent datastore used by the session management unit 110 to store the context information used for determining whether to provide suggested improvements to textual content to the user. The signal merging unit 120 of the session management unit 110 is configured to receive the information from the various sources of context information, to reformat the information received into a standard format that can be analyzed by the session management unit 110, and to store the formatted context information in the session management cache 115.

The session management unit 110 obtains information about the user, the client device, the application being used to author the textual content, and other information that the session management unit 110 can use to determine whether to suggest improvements to the textual content. In some implementations, the information obtained from the client-side interface unit 105 includes an intended audience for the textual content being authored by the user. The intended audience information may be available for text messages, emails, and/or chat messages by analyzing the intended recipients of these messages. The client-side interface unit 105 can obtain this information from the application in which the user is creating such messages. The session management unit 110 can also obtain document-specific action information from the client-side interface unit 105. The user may take certain actions on the textual content, such as accept some suggested improvements and reject other suggested improvements. The session management unit 110 takes the previous user actions into consideration when determining whether to suggest improvements to the user in some implementations. The session management unit 110 uses the previous user actions information to determine how to rank the suggested improvements in an order to be presented to the user.

The session management unit 110 also obtains context information from the data sources 130. The data sources 130 includes custom dictionaries in some implementations. A custom dictionary includes words that the user has selected to be added to the custom dictionary. The custom dictionary may include words that are not included in the standard dictionary used by the context adaptive writing assistant. The user can add words to this dictionary so that the context adaptive writing assistant will not flag these words as being misspelled.

In some implementations, the data sources 130 also include user settings or preferences information. As will be discussed in detail in the examples which follow, the user may configure various settings that determine which features provided by the context adaptive writing assistant are enabled and which of these features are disabled. The data sources 130 may also include user graph information. The graph information can represent relationships between the user who is authoring the textual content and other users, such as an intended recipient or audience of the textual content. The graph information may be derived from previous email messages, chat messages, text message, and/or other communications between the user authoring or editing the content and other people. In some implementations, the context adaptive writing assistant is implemented by an enterprise, and the graph information includes information identifying the user's supervisor, the user's colleagues, and people within the enterprise with whom the user typically collaborates. In some implementations, the graphs may include social information, such as people with whom the user is friends, acquaintances, and/or family members. The session management unit 110 may obtain context information from other data sources in addition to or instead of the examples shown in FIG. 1.

The personalizer unit 125 is configured to obtain personalized information for the user and to load this information into the session management cache 115 of the session management unit 110. The personalizer unit 125 is configured to query historical writing assistant data to obtain information indicative of how the user interacted with the writing assistant in the past. The personalizer unit 125 uses this information to build a profile of how the user has responded to suggested improvements in the past.

The profile adaptor unit 135 is configured to communicate with the session management unit 110 and the writing assistant microservice cluster 140. The writing assistant microservice cluster 140 includes various services that support the functionality provided by the context adaptive writing assistant. These services may include but are not limited to a spelling service, a thesaurus service, a cache service, and grammar service. The suggested improvements to the textual content are obtained from the writing assistant microservice cluster 140 in some implementations. The profile adaptor unit 135 is configured to submit textual content received by the session management unit 110 from the client-side support unit 105 to the microservices to analyze the service and provide suggested improvements. The spelling service is configured to identify words that are potentially misspelled in the textual content and to provide suggestions for correcting the potential misspellings. The thesaurus service provides suggestions for alternative words that may be substituted with words included in the textual content. The grammar service is configured to provide suggestions for improving grammar and punctuation. The cache service is configured to store information, at least temporarily, obtained from the other microservices. The profile adaptor unit 135 is configured to access the stored information from the cache service, when available, to reduce the computing resources required to satisfy requirements. In some implementations, the microservices that provide suggested improvements are implemented using natural language processing (NLP) models trained to provide the functionality associated with one of the services. For example, a first NLP model may be trained to identify spelling errors and to provide suggestions for correcting the spelling errors, a second NLP model may be trained to identify punctuation errors and to provide suggestions for correcting the punctuation errors, a third NLP mode may be trained to identify grammatical errors and to provide suggestions for correcting the grammatical issues. NLP models may be trained to provide these and/or other types of suggested improvements to the textual content.

The classification model 145 is a machine learning model trained to classify the level of formality of the textual content based on the context information obtained by the session management unit 110. The classification model may be implemented by a machine learning or deep neural network (DNN). In some implementations the classification model may be implemented by a convolutional neural network (CNN) or other model is trained to analyze the context information obtained for the user session and to output a classification of the level of formality of the text. The session management unit 110 is configured to format the context information and/or to extract feature information from the context information in some implementations prior to providing the context information to the classification model 145 as an input.

In some implementations, the textual content is provided to the classification model 145 each time that the textual content is updated by the user to reassess whether the classification of the textual content should be changed. In a non-limiting example to illustrate this concept, the user is drafting an email in an email application that utilizes the context adaptive writing assistant to provide suggested improvements to the textual content of the email. Initially, the user addresses the email to a friend, and the classification model 145 classifies the email as being informal. However, the user subsequently adds their supervisor as another recipient of the email, and the classification model 145 reclassifies the email as being formal and updates the behavior of the context adaptive writing assistant accordingly. The classification model 145 may be configured to classify context information according to a set of predetermined levels of formality. Each level is associated with a first set of features of the context adaptive writing assistant which are enabled and a second set of features of the context adaptive writing assistant which are disabled. The specific set of levels of formality for which the classification model 145 is trained may vary from implementation to implementation. The session management unit 110 adjusts the operating parameters of the context adaptive writing assistant according to the classification output by the classification model 145.

Figure 2:
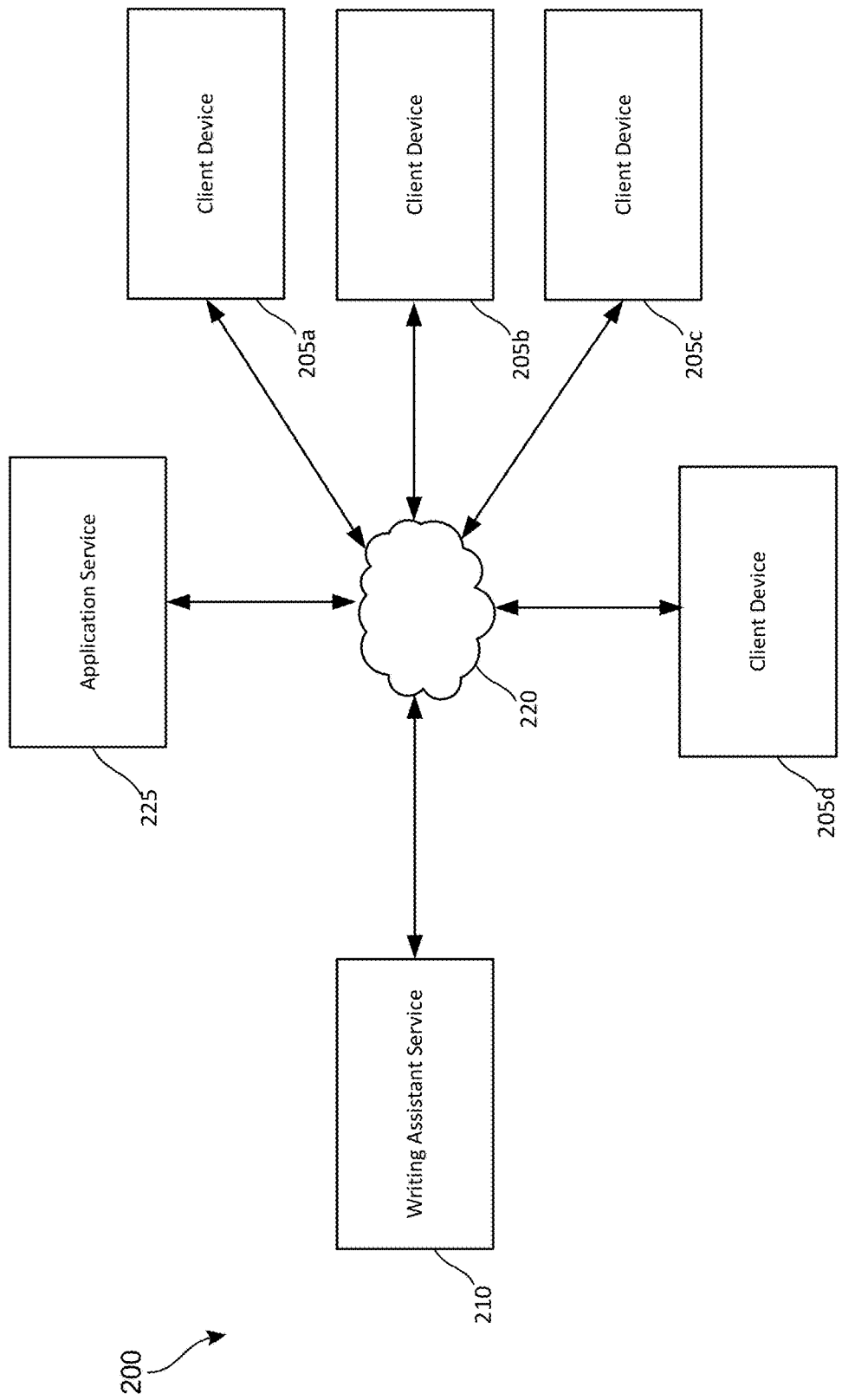
FIG. 2 is a diagram showing another example computing environment in which the techniques disclosed herein may be implemented.

FIG. 2 is a diagram showing an example computing environment 200 in which the techniques disclosed herein for providing context adaptive writing assistant services may be implemented. The computing environment 200 includes a writing assistant service 210. The example computing environment 200 also includes client devices 205*a*, 205*b*, 205*c*, and 205*d* (collectively referred to as client device 205) and application services 225. The client devices 205*a*, 205*b*, 205*c*, and 205*d* communicate with the writing assistant service 210 and/or the application service 225 via the network 220. Furthermore, the application service 225 communicates with the writing assistant service 210 via the network 220. The network 220 may be a combination of one or more public and/or private networks and may be implemented at least in part by the Internet.

In the example shown in FIG. 2, the writing assistant service 210 is implemented as a cloud-based service or set of services. The writing assistant service 210 implements the functionality of the session management unit 110, the personalizer unit 125, the profile adaptor unit 135, and the writing assistant microservice cluster 140 in some implementations. In some implementations, the data sources 130 is implemented, at least in part, by the writing assistant service 210. In other implementations, the data sources 130 is implemented, at least in part, by another service (not shown) and the session management unit 110 is configured to request context information from the various data sources 130.

The writing assistant service 210 is configured to provide context adaptive writing assistant services to applications provided by the application service 225 and/or for native applications on the client devices 205*a*-205*d*. The applications of the application service 225 and/or the client devices 205*a*-205*d* send textual content being authored or edited in the application to the writing assistant service 210. As discussed in the preceding examples, the writing assistant service 210 can provide context adaptive writing assistant functionality to a variety of different types of applications on the client device, such as but not limited to word processing applications, collaboration platforms, messaging applications, web browsers, presentation design applications, and/or other types of applications in which the textual content may be authored. The textual content may include text from a word processing document, a presentation, a text message, an email message, a chat message, and/or other type of textual content.

Figure 5A:
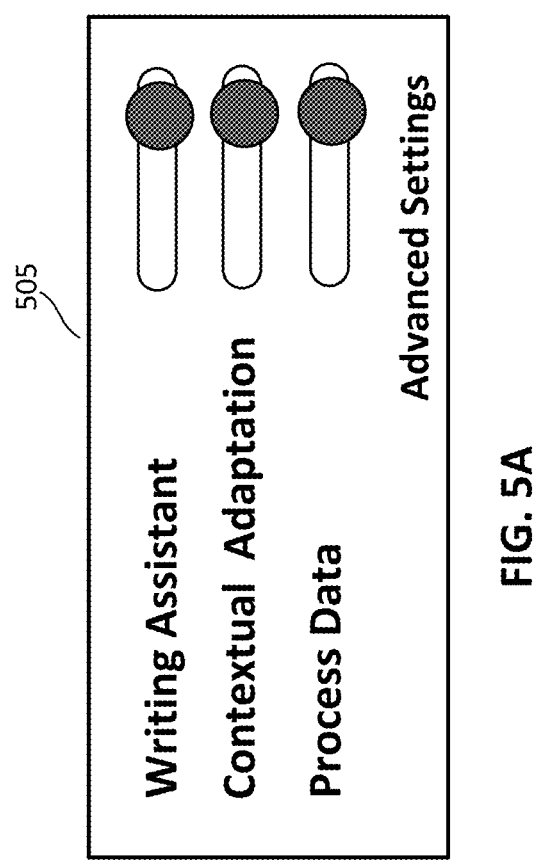
FIGS. 5A and 5B are examples of a user interface for configuring the behavior of the context adaptive writing assistant.
Figure 5B:
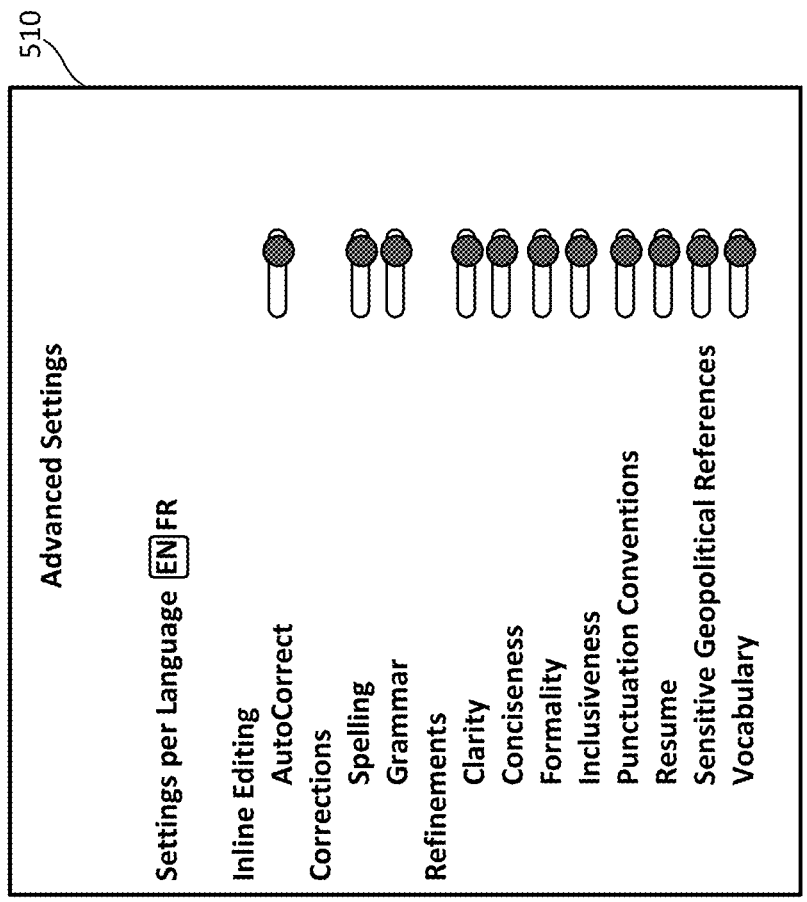

The writing assistant service 210 provides a personal and user-focused experience that is not provided by current writing assistant or proofreading services. The writing assistant service 210 is configured to analyze numerous data sources, as discussed in the preceding examples, to determine context information that indicates which types of suggested improvements the writing assistant service 210 presents to the user. One factor considered by the writing assistant service 210 when determining which suggested improvements to present to the user is a level of formality of the textual content being authored or edited by the user. In a non-limiting example to illustrate this concept, the writing assistant service 210 provides fewer suggested improvements to a user drafting an informal text message to a friend than to another user drafting a work-related email to their supervisor. Another factor that the writing assistant service 210 takes into account is the user interactions with the textual content being authored or edited. In a non-limiting example to illustrate this concept, the writing assistant service 210 tracks which suggested improvements the user has previously accepted or rejected for the document. The writing assistant service 210 ranks suggested improvements that were previously accepted by the user higher when subsequently presenting these suggested improvements to the user again, in some implementations. The writing assistant service 210 also determines that suggested improvements that have been previously rejected by the user should not be presented to the user. The writing assistant service 210 makes such decisions on these and other types of user interactions with the writing assistant service 210. The writing assistant service 210 provides a user interface, in some implementations, that enables the user to configure which types of suggested improvements the writing assistant service 210 should and should not present to the user. Examples of such a user interface are shown in FIGS. 5A and 5B, which are described in detail in the examples which follow.

The application service 225 provides cloud-based software and services that are accessible to users via the client devices 205*a*-205*d*. The application service 225 provides one or more software applications, including but not limited to communications platform and/or collaboration platform, a word processing application, a presentation design application, and/or other types of applications in which the user may create and/or access textual content. The textual content may be stored on the writing assistant service 210 and/or the client devices 205*a*-205*d*. The term "textual content" as used herein can be representative of any document or component in electronic form that can be created by a computing device, stored in a machine-readable storage medium, and/or transferred among computing devices over a network connection or via a machine-readable storage medium. Examples of such electronic documents include but are not limited to word processing documents, program code, presentations, websites (e.g., Microsoft SharePoint® sites), digital drawings, media files, components thereof, and the like. The one or more software applications provided by the application service 225 are configured to utilize the services provided by the writing assistant service 210 to analyze the textual content and provide suggestions for improving the textual content.

The client devices 205a, 205b, 205c, and 205d are each a computing device that may be implemented as a portable electronic device, such as a mobile phone, a tablet computer, a laptop computer, a portable digital assistant device, a portable game console, and/or other such devices. The client devices 205a, 205b, 205c, and 205d may also be implemented in computing devices having other form factors, such as a desktop computer, vehicle onboard computing system, a kiosk, a point-of-sale system, a video game console, and/or other types of computing devices. While the example implementation illustrated in FIG. 2 includes four client devices, other implementations may include a different number of client devices that utilize the application service 225 and/or the writing assistant service 210. Furthermore, in some implementations, the application functionality provided by the application service 225 is implemented by a native application installed on the client devices 205a, 205b, 205c, and 205d, and the client devices 205a, 205b, 205c, and 205d communicate directly with the writing assistant service 210 over a network connection.

In some implementations, the writing assistant service 210, or at least a portion of the functionality thereof, is implemented by the application services 225 to provide writing assistant-related services for users of the application services. In other implementations, the writing assistant service 210, or at least a portion of the functionality thereof, is implemented by a native application on the client devices 205a-205d.

Figure 3:
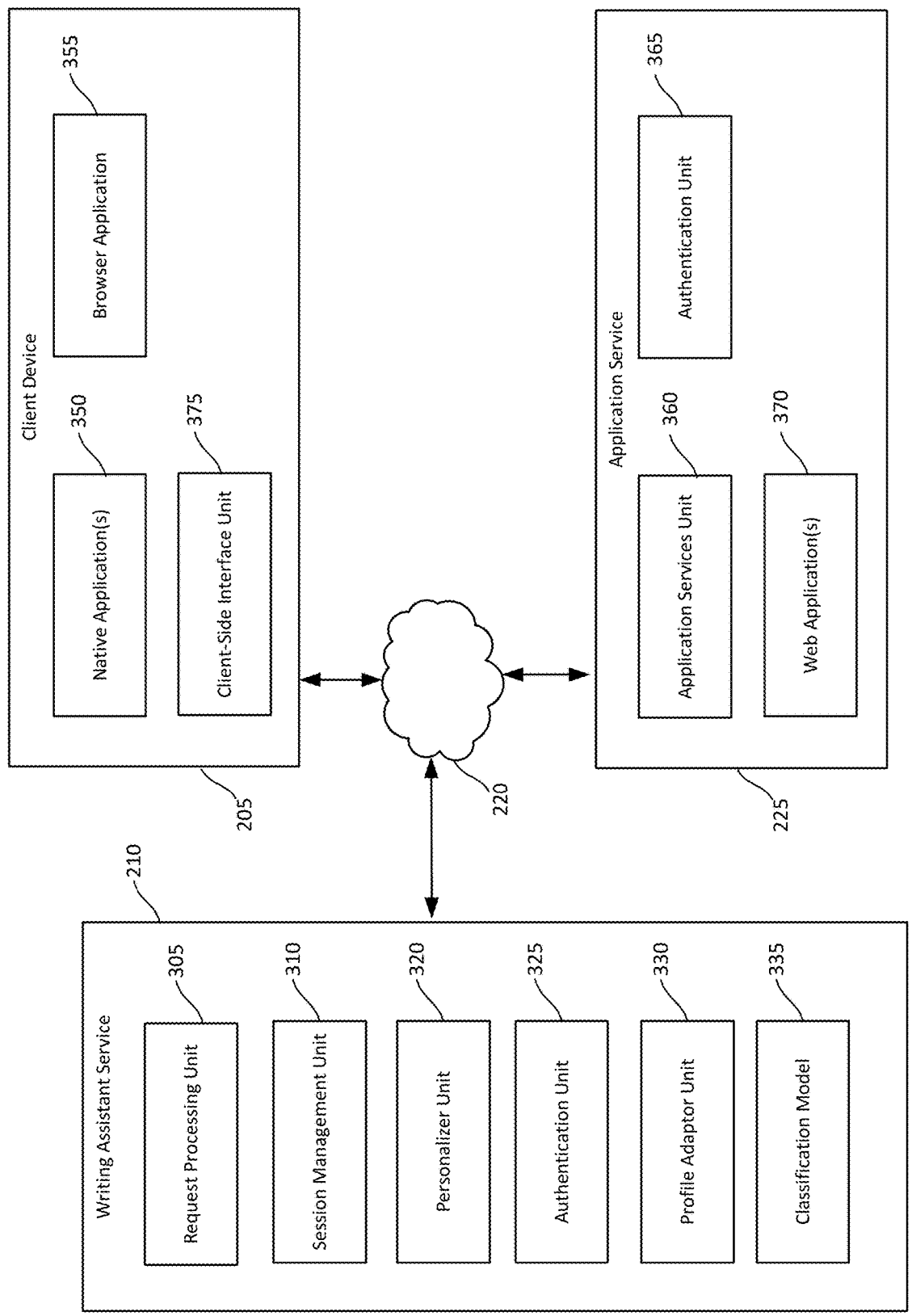
FIG. 3 is a diagram showing additional features of the writing assistant service, the client device, and the application service shown in FIG. 2.

FIG. 3 is a diagram showing additional features of the writing assistant service 210, the client device 205, and the application service 225. The writing assistant service 210 includes a request processing unit 305, a session management unit 310, a personalizer unit 320, an authentication unit 325, a profile adaptor unit 330, and a classification model 335.

The request processing unit 305 receives incoming requests for services provided by the writing assistant service 210 from the client device 205 and/or the application service 225. The incoming request includes textual content to be analyzed by the writing assistant service 210. The request processing unit 305 provides the textual content to the session management unit 310 for analysis. The session management unit 310 operates similarly to the session management unit 110 shown in FIG. 1. The session management unit 310 analyzes the textual content and generates suggested improvements to the textual content. The request processing unit 305 sends the suggested improvements to the client device 205 or the application service 225 from which the request originated via the client-side interface unit 375. The client-side interface unit 375 operates similarly to the client-side interface unit 105 shown in FIG. 1.

The session management unit 310 is configured to analyze the textual content to generate suggested improvements to the textual content (if any) and to determine whether these suggested improvements should be presented to the user. As discussed in the preceding examples, the session management unit 310 may rely on one or more microservices to generate the recommended improvements, such as but not limited to a spelling service, a thesaurus service, a grammar service, and a punctuation service. The microservices may be implemented by the writing assistant microservice cluster 140 shown in FIG. 1, and profile adaptor unit 330 may implement the profile adaptor unit 135 shown in FIG. 1. The session management unit 310 provides the textual content to the profile adaptor unit 135, which in turn provides the textual content to one or more microservices for analysis. Each microservice may generate a set of one or more suggested improvements to the textual context. The suggested improvements are received by the profile adaptor unit 330, which in turn provides the suggested improvements to the session management unit 310. The session management unit 310 combines the recommendations from each of the services that provided suggested improvements and provides the suggested improvements to the client device 205 or the application service 225 which requested the suggested improvements.

The session management unit 310 utilizes the classification model 335 to analyze the textual content to classify the level of formality of the textual content based on the context information obtained by the session management unit 110. The classification model 335 is similar to the classification model 145 shown in FIG. 1 and outputs a predicted writing assistant level to be applied when providing the context adapted writing services. The session management unit 310 adjusts the operating parameters of context adaptive writing assistant according to the classification output by the classification model 335.

The authentication unit 325 provides functionality for verifying whether users are permitted to access the services provided by the writing assistant service 210. In some implementations, the authentication unit 325 provides functionality for receiving authentication credentials for the users from their respective client device 205 and/or from the application service 225. The authentication unit 325 may be configured to verify that the authentication credentials are valid and permit the users to access the services provided by the writing assistant service 210 responsive to the authentication credentials being valid.

The application service 225 includes an application services unit 360, an authentication unit 365, and a web application 370. The application services unit 360 provides functionality for users to consume, create, share, collaborate on, and/or modify various types of textual content including textual content that may be analyzed by the writing assistant service 210. The application services unit 360 may utilize the writing assistant service 210 to analyze textual content being authored or edited by a user of the client device 205. In some implementations, the application services unit 360 provides a web-based application 370 to enable users to access at least a portion of the services provided by the application service 225. In other implementations, users may access the services provided by the application service 225 via one or more native applications 350 installed on the client device 205. The application services unit 360 may in turn obtain the services provided by the writing assistant service 210.

The authentication unit 365 provides functionality for verifying whether users are permitted to access the services provided by the application service 225 and/or the writing assistant service 210. In some implementations, the authentication unit 365 provides functionality for receiving authentication credentials for the users from their respective client device 205. In such implementations, the authentication unit 365 verifies that the authentication credentials are valid and permit the users to access the services and/or documents provided by the application service 225 and/or the writing assistant service 210, responsive to the authentication credentials being valid.

The client device 205 may include one or more native applications 350 and/or a browser application 355. In some implementations, the one or more native applications 350 includes a native application configured to communicate with the application service 225 to enable users to consume, create, share, collaborate on, and/or modify textual content using the services provided by the application service 225. In some implementations, the one or more native applications 350 includes a native application configured to communicate with the writing assistant service 210. In such implementations, the native application provides an interface for users to interact with the writing assistant service 210 and/or the application service 225.

The browser application 355 is an application for accessing and viewing web-based content, the web-based content may be provided by the application service 225 and/or the writing assistant service 210. The application service 225 may provide a web application 370 that enables users to consume, create, share, collaborate on, and/or modify content. A user of the client device 205 may access the web application 370 via the browser application 355, and the browser application 355 renders a user interface for interacting with the application services 225 in the browser application 355. The browser application 355 may be used to access the services provided by the application service 225 and/or the writing assistant service 210 in instances in which the client device 205 is not subjected to network connectivity constraints.

The application services 225 and/or the writing assistant service 210 may support both the one or more web-enabled native applications 350 and one or more web applications 370, and the users may choose which approach best suits their needs. The writing assistant service 210 may also provide support for the one or more native applications 350, the browser application 355, or both to provide functionality for a user of the client device 205 to obtain the services provided by the writing assistant service 210.

Figure 4A:
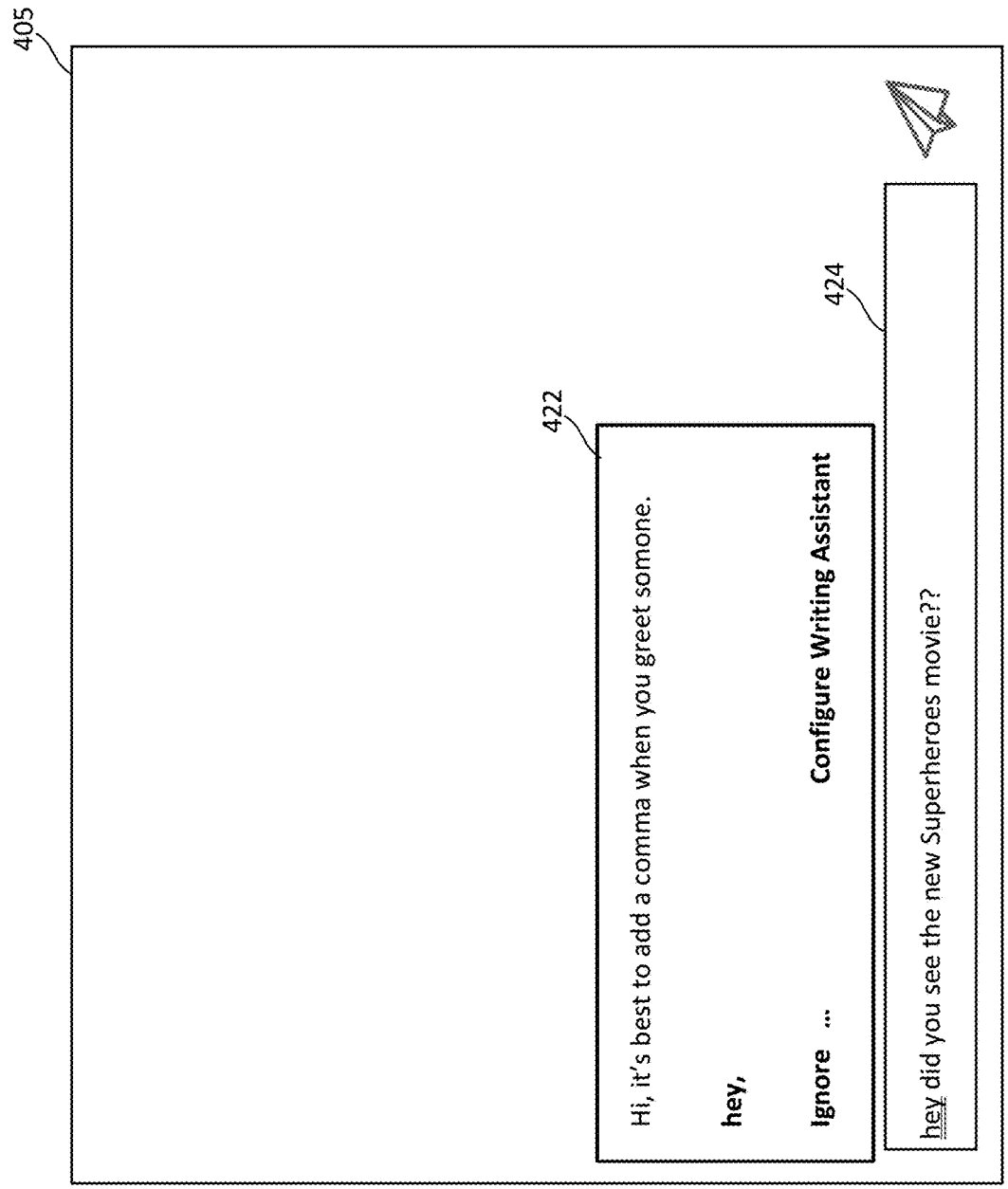
Figure 4B:
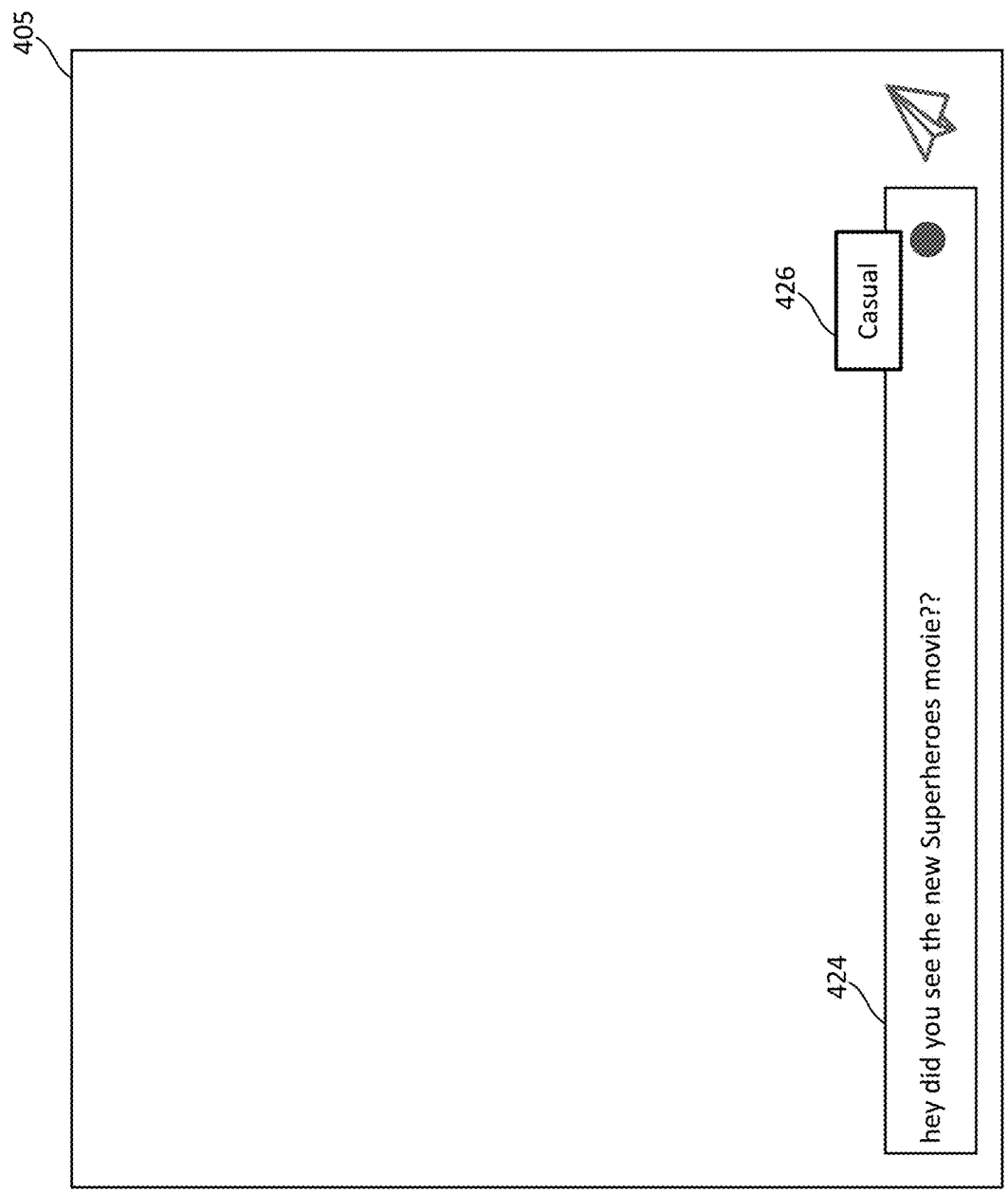
Figure 4C:
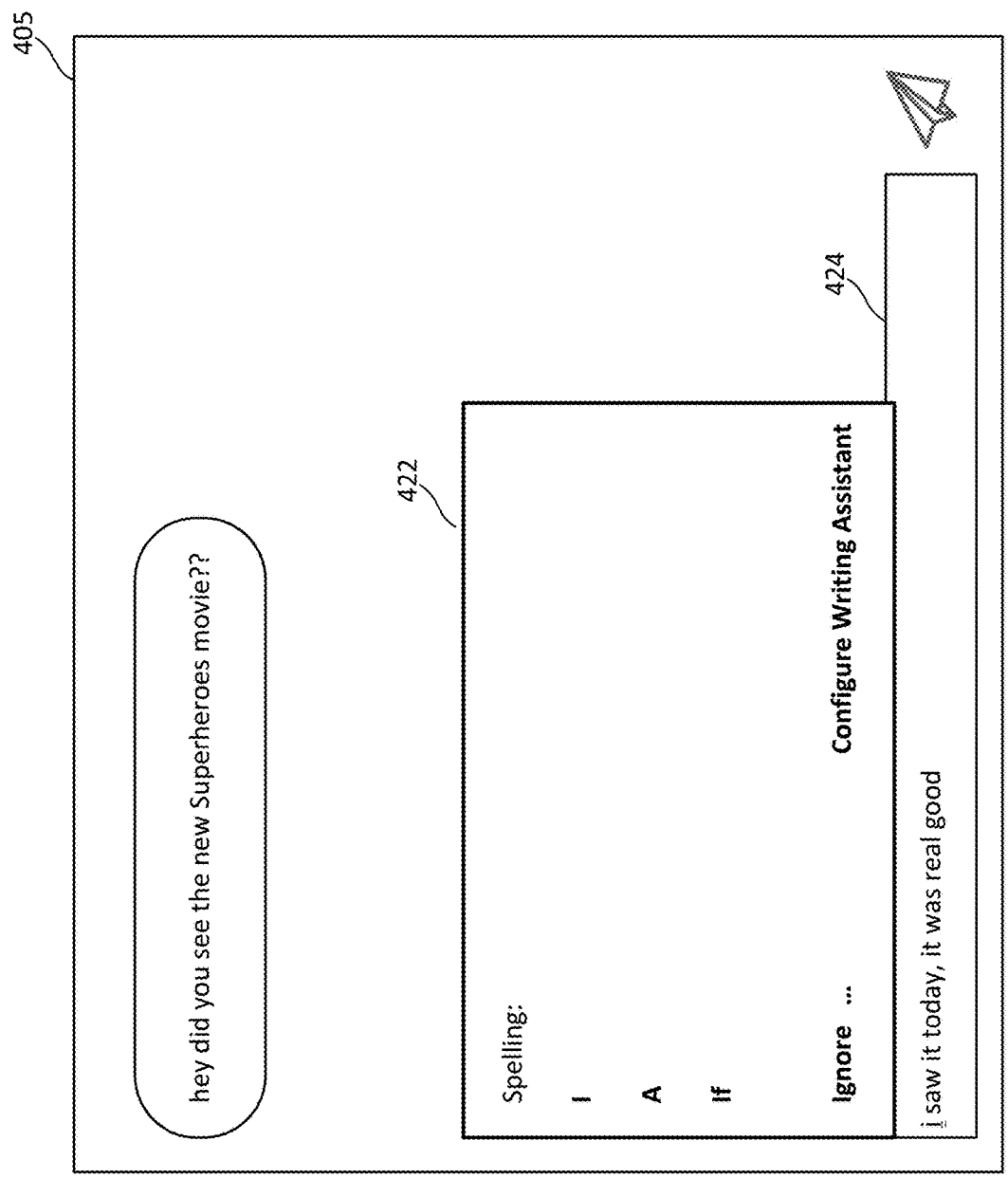
Figure 4D:
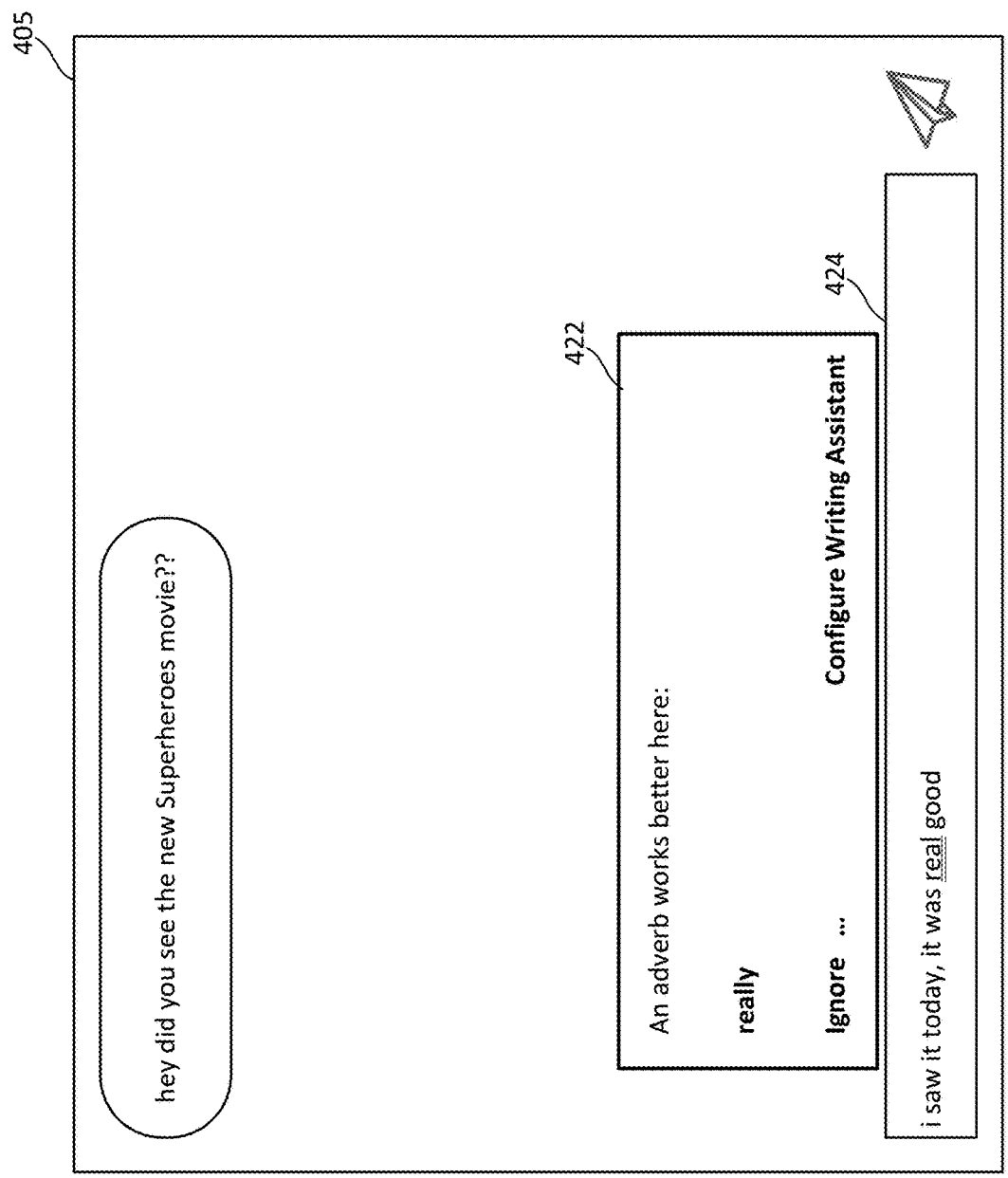

FIGS. 4A-4E show an example of a user interface 405 of an example text messaging application. The user interface 405 may be generated by a native application 350 of the client device 205 or the web application 370 of the application service 225. The examples shown in FIGS. 4A, 4C, and 4D show an example of the text messaging application utilizing the writing assistant service 210 to provide suggested improvements to the textual content of the text messages in which the context adaptive writing assistant functionality is disabled. The examples shown in FIGS. 4B and 4E show an example of the text messaging application that is utilizing the context adaptive writing assistant services provided by the writing assistant service 210. The features of the context adaptive writing assistant is based at least in part on the type of application in which the writing assistant services are being used. In a non-limiting example, composing text message in a text messaging application is treated as less formal than composing an email. Consequently, less editing features of the context adaptive writing assistant are enabled than would be enabled for a similar communication between the same author and recipient via an email application. A technical benefit of this approach is that the context adaptive writing assistant provides less notifications that may distract the user and interrupt the user workflow, in situations where the formality of the textual content being authored is less important.

The user interface 405 shown in FIG. 4A includes a text entry field 424 in which the user can type a test message to one or more recipients. A first user has typed the message "hey did you see the new Superheroes movie??" in the text entry field 424. FIG. 4A shows the default behavior of the writing assistant service 210 without the context adaptive writing assistant techniques provided herein. The writing assistant service 210 analyzes the textual content and provides a suggested improvement to the textual content. The suggested improvement is shown in the suggestion panel 422 overlaid on the user interface 405, and the word "hey" has also been double underlined in the text entry field 424 to indicate that the suggested improvement is related to this word of the text message. In this example, the writing assistant service 210 suggests that the message could be improved by adding a comma. The user may select "hey," from the user interface to cause the textual content of the text message to be automatically updated. The user may select "Ignore" to provide feedback to the writing assistant service 210 that the user does not wish to make the desired change. The user may also select "Configure Writing Assistant" to configure the writing assistant service 210. FIGS. 5A and 5B show an example of a writing assistant configuration user interface that can be used to configure the behavior of the context adaptive writing assistant. The writing assistant configuration user interface is described in detail in the examples which follow.

FIG. 4B shows an example of the user interface 405 in which the context adaptive writing assistant of the writing assistant service 210 has been enabled. In this example, the writing assistant service 210 analyzes the context of the text message being drafted and determines that the message is associated with a casual conversation based on the context information determined by the writing assistant service 210. In this example, writing assistant service 210 identifies the conversation as being casual based on the recipient information for the text message, the relationship between the recipient of the text message and the author of the text message, and other information indicative of the conversation between the author and the recipient being a casual conversation. The session management unit 110 of the writing assistant service 210 accesses the user settings from the data sources 130 to determine the context adaptive writing assistant settings for the user and determines that the user has selected to disable grammar, punctuation, and spelling checks for casual conversations. The user interface 405 is updated to include a writing assistant mode indicator 426 that indicates that the conversation has been determined to be a casual one by the writing assistant service 210 so that the user is aware that the default behavior of the writing assistant service 210 has been overridden for this conversation. In some implementations, the user can click on or otherwise activate the writing assistant mode indicator 426 to cause the writing assistant configuration user interface shown in FIGS. 5A and 5B be displayed to allow the user to review and/or modify the context adaptive writing assistant service operating parameters. In some implementations, the writing assistant mode indicator 426, when activated, causes a feedback user interface to be presented to the user that enables the user to provide feedback on why the user believes that the conversation was incorrectly classified by the writing assistant service 210 as being a casual conversation and to override the classification determined by the writing assistant service 210. In some implementations, the feedback provided by the user is used to fine-tune the performance of the classification model 145 to improve the predictions made by the model.

FIGS. 4C and 4D provide two additional examples of the user interface 405 which would be displayed on the client device 205 of the recipient of the text message in the example shown in FIG. 4A. The recipient of the text message has typed but not yet sent a reply to the first text message. The writing assistant service 210 analyzes the text of the text message and provides suggested improvements before the message is sent to the author of the first text message. FIG. 4C shows an example in which a spelling error has been detected and the suggestion panel 422 provides the user with a set of suggested spellings. FIG. 4D shows an example in which a grammatical error has been detected and the suggestion panel 422 provides the user with a suggestion for correcting the grammatical error. In the examples shown in FIGS. 4C and 4D, the context adaptive writing assistant functionality of the writing assistant service 210 is disabled. FIG. 4E shows an example of the user interface 405 on the user device of the recipient of the email where the context adaptive writing assistant functionality of the writing assistant service 210 has been enabled. In this example, the writing assistant mode indicator 426 is displayed indicating that the context adaptive writing assistant has determined that this is a casual message as in the example shown in FIG. 4B. The grammar, punctuation, and spelling checks for text messages being composed by the recipient of the first message are also disabled. Thus, portions of the text message that would otherwise have been emphasized to indicate suggested improvements have not been highlighted and the suggestion panel 422 is not shown.

Figure 4F:
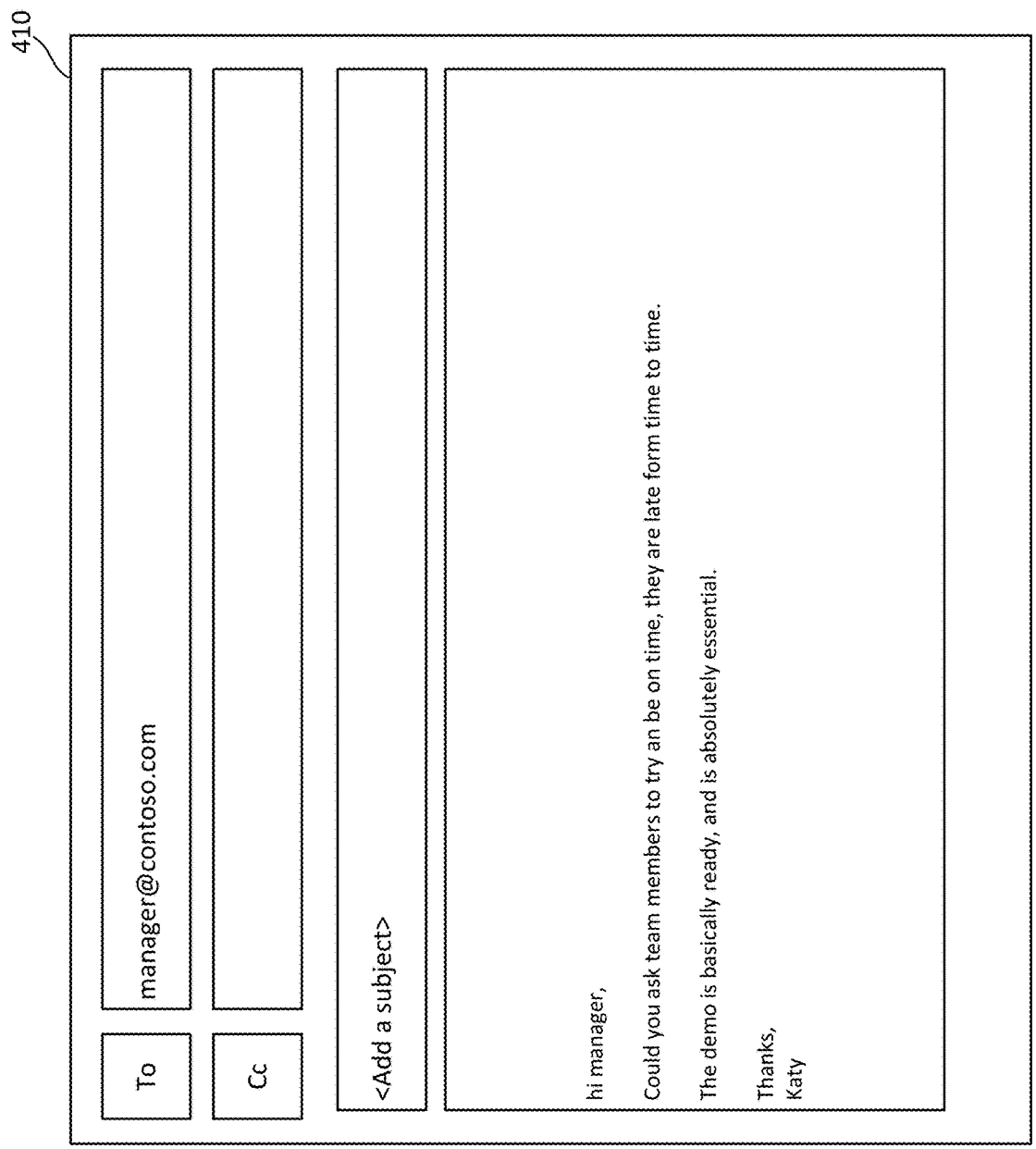
Figure 4G:
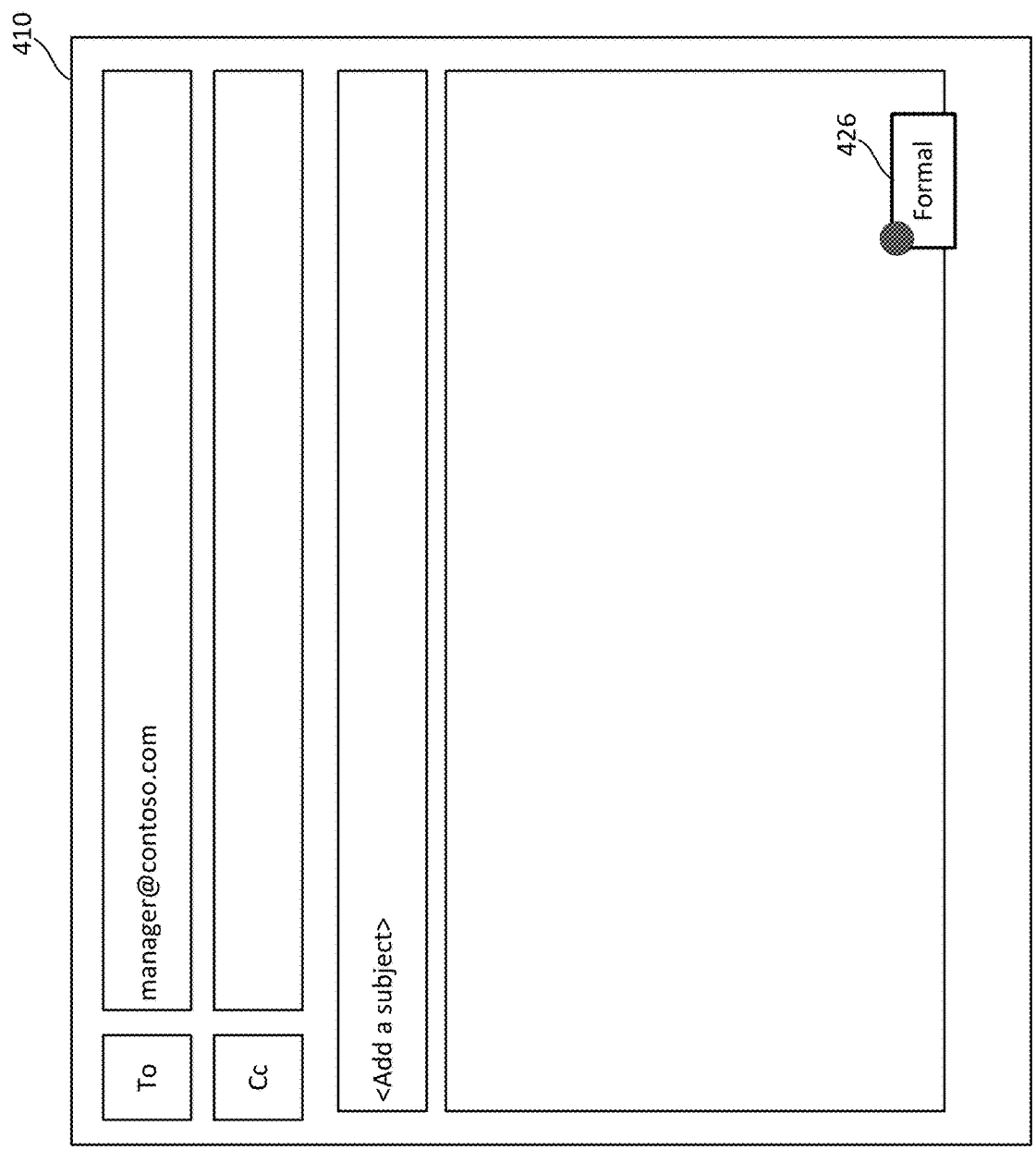
Figure 4H:
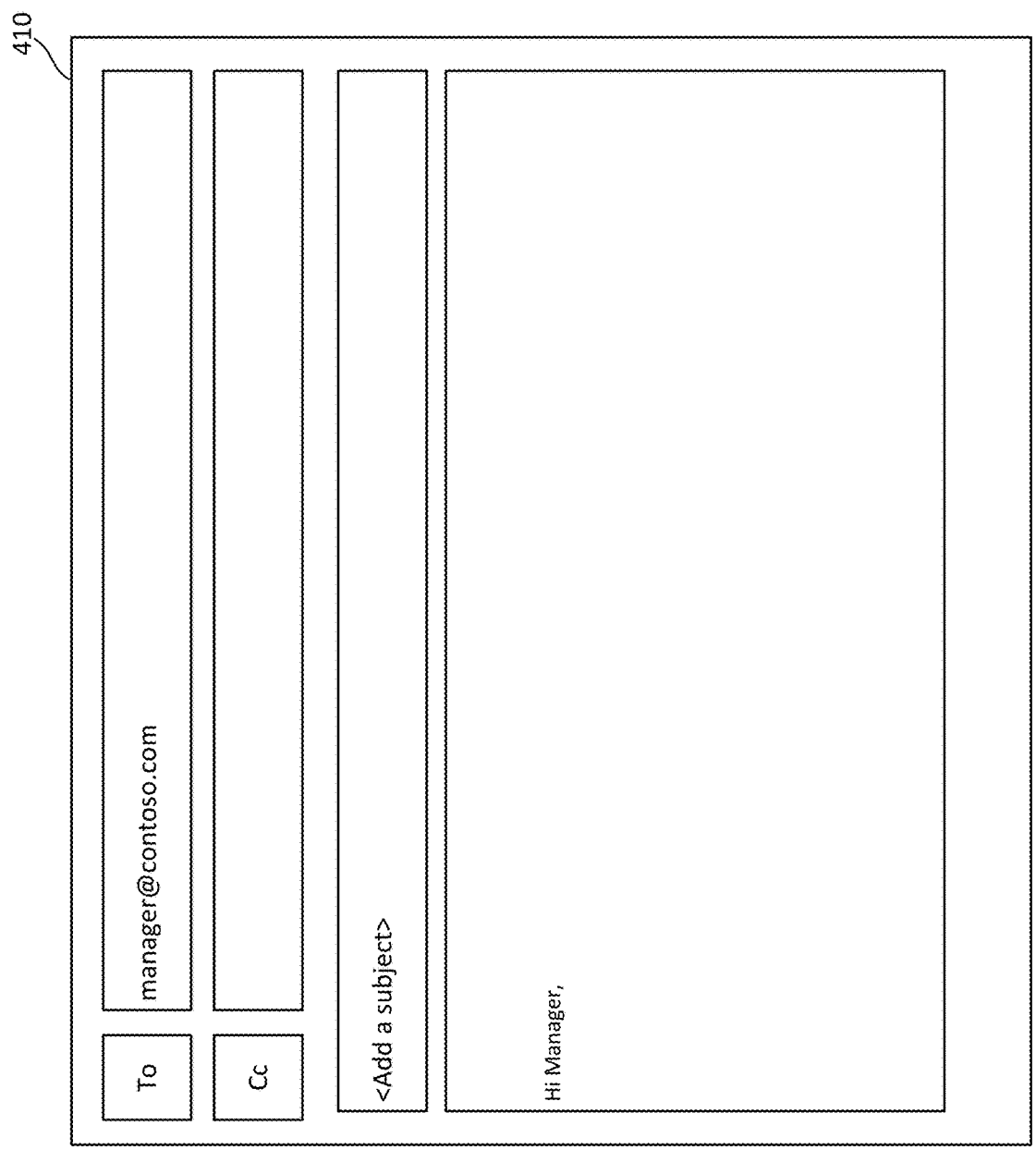
Figure 4I:
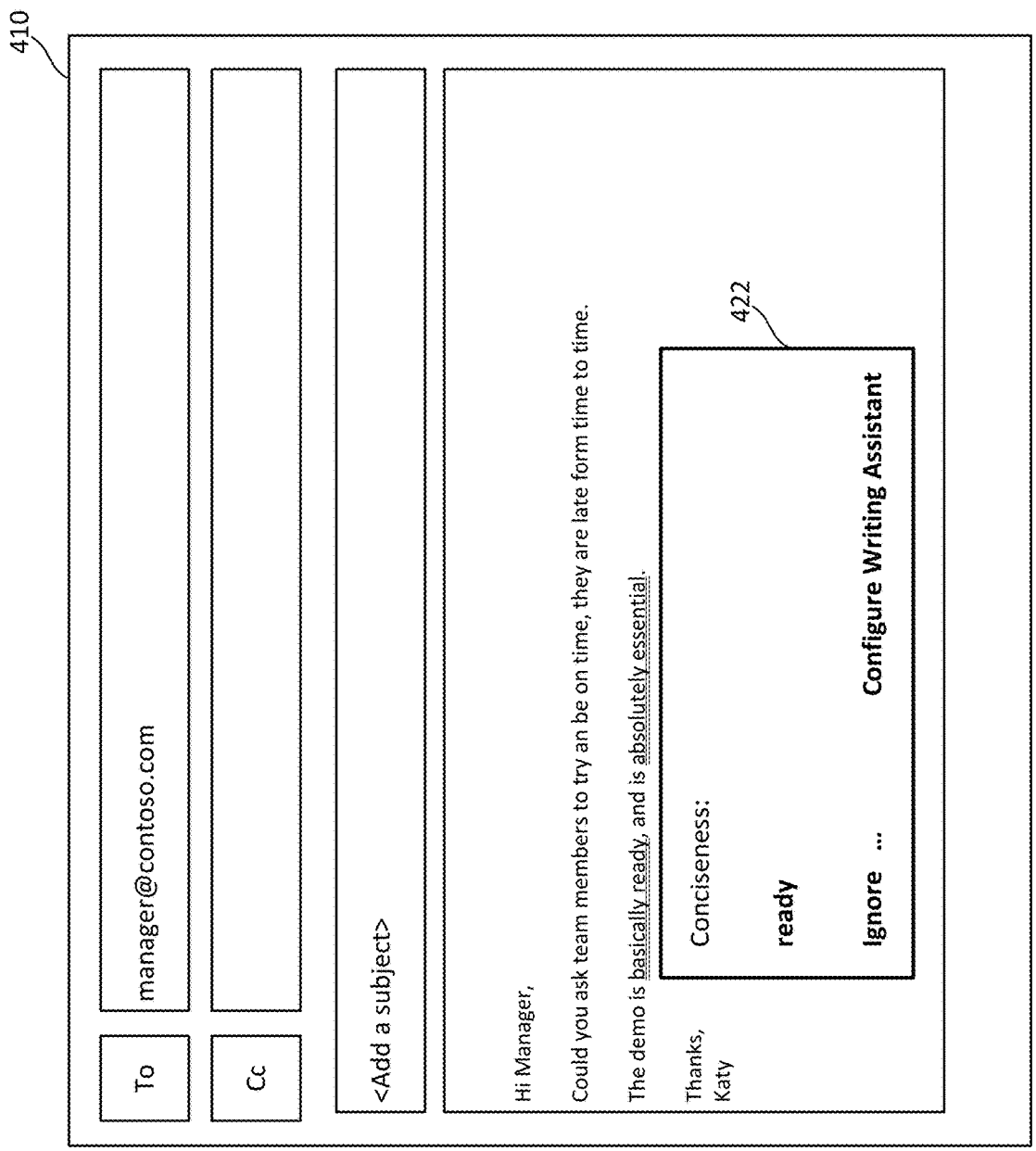

FIGS. 4F-4I show examples of a user interface 410 of an example email application. FIG. 4F shows an example of the user interface 410 in which an email from an employee to her manager has been typed. The email has not yet been analyzed by the writing assistant service 210. In the example shown in FIG. 4G, the context adaptive writing assistant functionality of the writing assistant service 210 is enabled, and the writing assistant service 210 analyzes the contents of each of the fields of the user interface 410 to generate the context information used to determine which features the writing assistant service 210 provides. In the example shown in FIG. 4G, the author enters her manager's email address in the "To" field. The writing assistant service 210 analyzes the email address, determines that the user is drafting an email to her manager, and determines that the email is formal writing. Consequently, the grammar, punctuation, and spelling checks and other features associated with formal writing have been enabled, and the writing assistant mode indicator 426 is displayed so that the user is made aware that the context adaptive writing assistant is operating in the formal writing mode. FIG. 4H shows another example in which the greeting for to the manager has been properly capitalized and punctuated. In some implementations, the writing assistant service 210 automatically adds the properly formatted header in response to the author of the email entering the email address and the determination that the email is a formal writing. In other implementations, the header may have been typed informally, as shown in FIG. 4F, and the writing assistant service 210 automatically reformats the header to have proper grammar, punctuation, and spelling. FIG. 4I shows an example in which the writing assistant service 210 has provided suggested improvements to the text of the email. The terms that are associated with the suggestions have been emphasized by double-underlining the terms in the text of the email. In other implementations, these terms may be emphasized by rendering the terms in bold text, highlighting the text, and/or other means for calling attention to the suggested improvements to the textual content. The suggestion panel 422 shows one of the suggested improvements to the textual content.

Figure 4J:
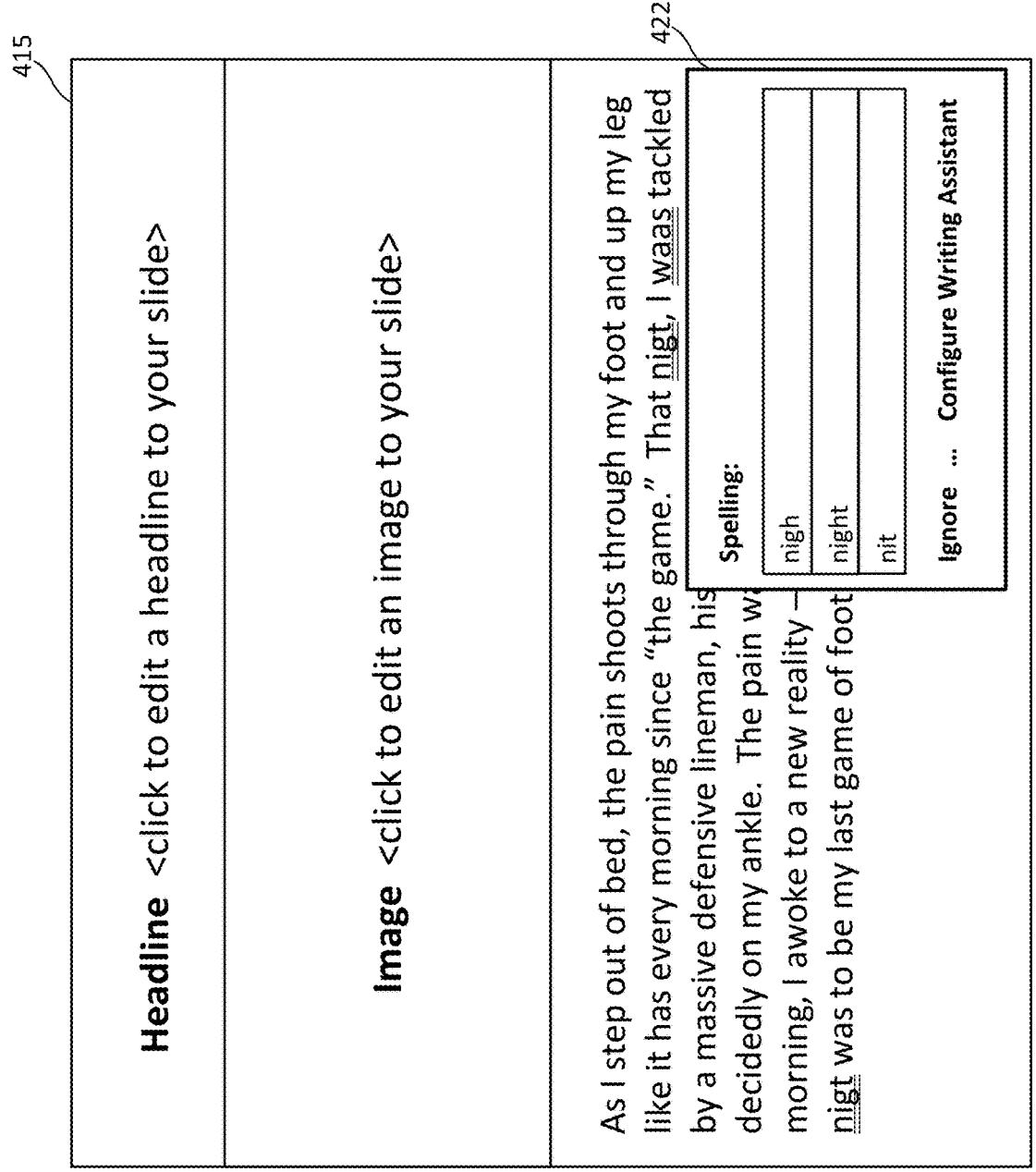

FIGS. 4J and 4K show examples of a user interface 415 of an example presentation design application. The context adaptive writing assistant functionality of the writing assistant service 210 is enabled, and the writing assistant service 210 has analyzed the textual content and provided suggested improvements to the textual content. The suggestions for improving the textual content have been emphasized by double-underlining the terms in the text textual content of the presentation slide. The examples shown in FIGS. 4J and 4K include multiple instances of the word "night" having been mistyped as "nigt." FIG. 4J shows a first example in which a spelling error has been detected and the suggestion panel 422 provides the user with a set of suggested spellings. The user can select the word "night" from the list of terms provided in the suggestion panel 422. The writing assistant service 210 remembers the user's previous selections and can rank the suggestions for subsequent misspellings of the word "night" first in the list of suggested spellings. A technical benefit of this approach is that the user experience is improved because the order of the suggestions provided to the user is such that the selection the user is most likely to make is ranked first in the list of selections.

FIGS. 5A and 5B are examples of user interfaces 505 and 510 for configuring the behavior of the context adaptive writing assistant functionality provided by the writing assistant service 210. The user interfaces 505 and 510 may be displayed by a native application 350 on the client device 205 or by the web application 370 of the application service 225. The user interface 505 shown in FIG. 5A provides controls for enabling or disabling the writing assistant service, enabling or disabling the context adaptive writing assistant, and enabling or disabling the use of user data to determine the context information used to make decisions. The user interface 510 shown in FIG. 5B permits the user to access advanced settings that provide fine-grained control over various functions of the context adaptive writing assistant. The specific functions that are available to be configured vary from implementation to implementation.

Figure 6:
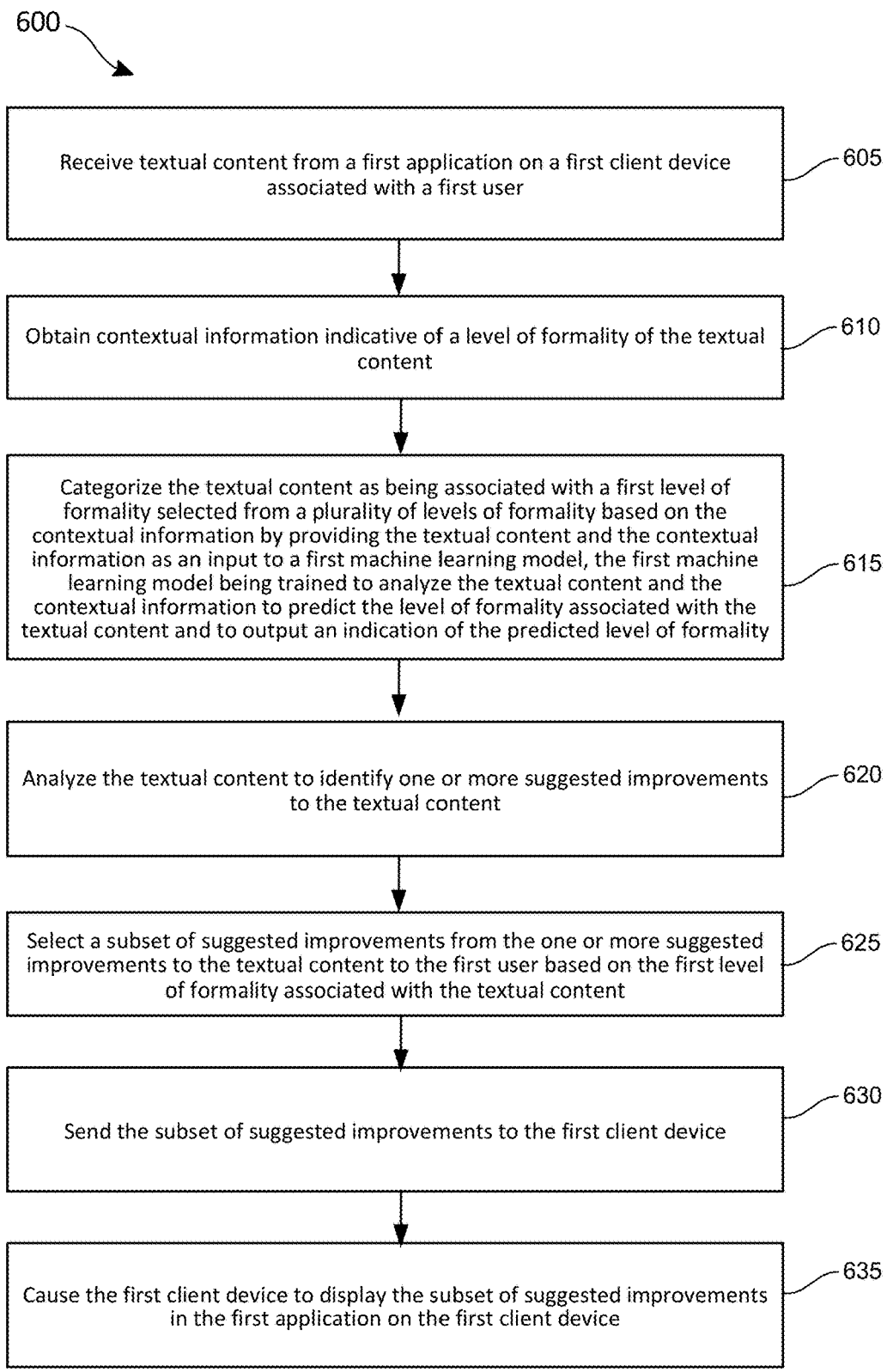
FIG. 6 is an example flow chart of an example process for providing context adaptive recommendations.

FIG. 6 is an example flow chart of an example process 600 for providing a context adaptive writing assistant service. The process 600 can be implemented by the writing assistant service 210 shown in the preceding example. The process 600 includes an operation 605 of receiving textual content from a first application on a first client device 205 associated with a first user. As discussed in the preceding examples, a native application 350 on the client device 205 or an application provided by the application service 225 provide a user interface for authoring and/or editing the textual content. The textual content is sent to the writing assistant service 210 for analysis.

The process 600 also includes an operation 610 of obtaining contextual information indicative of a level of formality of the textual content. As discussed in the preceding examples, context information can be obtained by the session management unit 110 from various data sources, such as the data sources 130.

The process 600 includes an operation 615 of categorizing the textual content as being associated with a first level of formality selected from a plurality of levels of formality based on the contextual information by providing the textual content and the contextual information as an input to a first machine learning model. The first machine learning model is trained to analyze the textual content and the contextual information to predict the level of formality associated with the textual content and to output an indication of the predicted level of formality. In some implementations, a classification model, such as the classification model 145 is used to analyze and categorize the textual content and the context information to determine a level of formality associated with the textual content. The content adaptive writing assistant service 210 is configured to use the level of formality information to enable or disable certain features of the context adaptive writing assistant based on the level of formality. A technical benefit of this approach is that the user experience and workflow are improved by providing recommendations for improving the textual content that are appropriate for that particular usage scenario.

The process 600 includes an operation 620 of analyzing the textual content to identify one or more suggested improvements to the textual content. The session management unit 110 provides the textual content to an writing assistant microservice cluster 140 in some implementations, and the microservices analyze the textual content and provide the suggested improvements. In other implementations, the session management unit 110 provides the textual content to one or more NLP models configured to analyze the textual content and output suggested improvements to the textual content.

The process 600 includes an operation 625 of selecting a subset of suggested improvements from the one or more suggested improvements to the textual content to the first user based on the first level of formality associated with the textual content. As discussed in the preceding examples, the microservice cluster 140 and/or the NLP models may provide many different types of suggested improvements to the textual content. However, the context adaptive writing assistant service 210 is configured to selectively disable certain types of suggested improvements dependent on the level of formality of the textual content. This approach allows the context adaptive writing assistant service 210 to provide types of suggestions that are predicted to be helpful in the current usage scenario without interrupting the user workflow or being unduly intrusive.

The process 600 includes an operation 630 of sending the subset of suggested improvements to the first client device and an operation 635 of causing the first client device to display the subset of suggested improvements in the first application on the first client device. The subset of suggested improvements are provided to the client device 205 or the application service 225 for presentation to the first user.

The detailed examples of systems, devices, and techniques described in connection with FIGS. 1-6 are presented herein for illustration of the disclosure and its benefits. Such examples of use should not be construed to be limitations on the logical process embodiments of the disclosure, nor should variations of user interface methods from those described herein be considered outside the scope of the present disclosure. It is understood that references to displaying or presenting an item (such as, but not limited to, presenting an image on a display device, presenting audio via one or more loudspeakers, and/or vibrating a device) include issuing instructions, commands, and/or signals causing, or reasonably expected to cause, a device or system to display or present the item. In some embodiments, various features described in FIGS. 1-6 are implemented in respective modules, which may also be referred to as, and/or include, logic, components, units, and/or mechanisms. Modules may constitute either software modules (for example, code embodied on a machine-readable medium) or hardware modules.

In some examples, a hardware module may be implemented mechanically, electronically, or with any suitable combination thereof. For example, a hardware module may include dedicated circuitry or logic that is configured to perform certain operations. For example, a hardware module may include a special-purpose processor, such as a field-programmable gate array (FPGA) or an Application Specific Integrated Circuit (ASIC). A hardware module may also include programmable logic or circuitry that is temporarily configured by software to perform certain operations and may include a portion of machine-readable medium data and/or instructions for such configuration. For example, a hardware module may include software encompassed within a programmable processor configured to execute a set of software instructions. It will be appreciated that the decision to implement a hardware module mechanically, in dedicated and permanently configured circuitry, or in temporarily configured circuitry (for example, configured by software) may be driven by cost, time, support, and engineering considerations.

Accordingly, the phrase "hardware module" should be understood to encompass a tangible entity capable of performing certain operations and may be configured or arranged in a certain physical manner, be that an entity that is physically constructed, permanently configured (for example, hardwired), and/or temporarily configured (for example, programmed) to operate in a certain manner or to perform certain operations described herein. As used herein, "hardware-implemented module" refers to a hardware module. Considering examples in which hardware modules are temporarily configured (for example, programmed), each of the hardware modules need not be configured or instantiated at any one instance in time. For example, where a hardware module includes a programmable processor configured by software to become a special-purpose processor, the programmable processor may be configured as respectively different special-purpose processors (for example, including different hardware modules) at different times. Software may accordingly configure a processor or processors, for example, to constitute a particular hardware module at one instance of time and to constitute a different hardware module at a different instance of time. A hardware module implemented using one or more processors may be referred to as being "processor implemented" or "computer implemented."

Hardware modules can provide information to, and receive information from, other hardware modules. Accordingly, the described hardware modules may be regarded as being communicatively coupled. Where multiple hardware modules exist contemporaneously, communications may be achieved through signal transmission (for example, over appropriate circuits and buses) between or among two or more of the hardware modules. In embodiments in which multiple hardware modules are configured or instantiated at different times, communications between such hardware modules may be achieved, for example, through the storage and retrieval of information in memory devices to which the multiple hardware modules have access. For example, one hardware module may perform an operation and store the output in a memory device, and another hardware module may then access the memory device to retrieve and process the stored output.

In some examples, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by, and/or among, multiple computers (as examples of machines including processors), with these operations being accessible via a network (for example, the Internet) and/or via one or more software interfaces (for example, an application program interface (API)). The performance of certain of the operations may be distributed among the processors, not only residing within a single machine, but deployed across several machines. Processors or processor-implemented modules may be in a single geographic location (for example, within a home or office environment, or a server farm), or may be distributed across multiple geographic locations.

Figure 7:
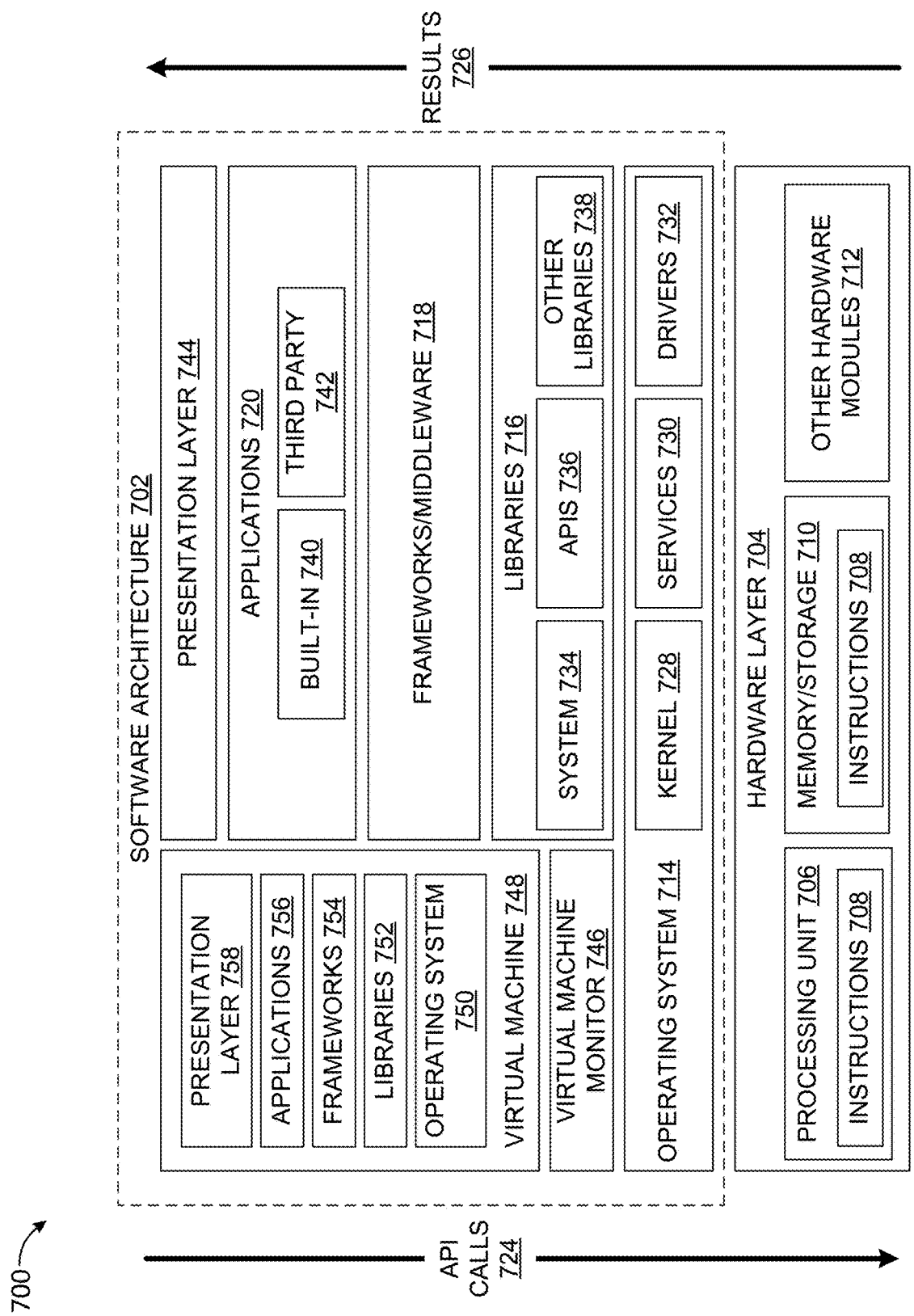
FIG. 7 is a block diagram showing an example software architecture, various portions of which may be used in conjunction with various hardware architectures herein described, which may implement any of the described features.

FIG. 7 is a block diagram 700 illustrating an example software architecture 702, various portions of which may be used in conjunction with various hardware architectures herein described, which may implement any of the above-described features. FIG. 7 is a non-limiting example of a software architecture, and it will be appreciated that many other architectures may be implemented to facilitate the functionality described herein. The software architecture 702 may execute on hardware such as a machine 800 of FIG. 8 that includes, among other things, processors 810, memory 830, and input/output (I/O) components 850. A representative hardware layer 704 is illustrated and can represent, for example, the machine 800 of FIG. 8. The representative hardware layer 704 includes a processing unit 706 and associated executable instructions 708. The executable instructions 708 represent executable instructions of the software architecture 702, including implementation of the methods, modules and so forth described herein. The hardware layer 704 also includes a memory/storage 710, which also includes the executable instructions 708 and accompanying data. The hardware layer 704 may also include other hardware modules 712. Instructions 708 held by processing unit 706 may be portions of instructions 708 held by the memory/storage 710.

The example software architecture 702 may be conceptualized as layers, each providing various functionality. For example, the software architecture 702 may include layers and components such as an operating system (OS) 714, libraries 716, frameworks 718, applications 720, and a presentation layer 744. Operationally, the applications 720 and/or other components within the layers may invoke API calls 724 to other layers and receive corresponding results 726. The layers illustrated are representative in nature and other software architectures may include additional or different layers. For example, some mobile or special purpose operating systems may not provide the frameworks/middleware 718.

The OS 714 may manage hardware resources and provide common services. The OS 714 may include, for example, a kernel 728, services 730, and drivers 732. The kernel 728 may act as an abstraction layer between the hardware layer 704 and other software layers. For example, the kernel 728 may be responsible for memory management, processor management (for example, scheduling), component management, networking, security settings, and so on. The services 730 may provide other common services for the other software layers. The drivers 732 may be responsible for controlling or interfacing with the underlying hardware layer 704. For instance, the drivers 732 may include display drivers, camera drivers, memory/storage drivers, peripheral device drivers (for example, via Universal Serial Bus (USB)), network and/or wireless communication drivers, audio drivers, and so forth depending on the hardware and/or software configuration.

The libraries 716 may provide a common infrastructure that may be used by the applications 720 and/or other components and/or layers. The libraries 716 typically provide functionality for use by other software modules to perform tasks, rather than rather than interacting directly with the OS 714. The libraries 716 may include system libraries 734 (for example, C standard library) that may provide functions such as memory allocation, string manipulation, file operations. In addition, the libraries 716 may include API libraries 736 such as media libraries (for example, supporting presentation and manipulation of image, sound, and/or video data formats), graphics libraries (for example, an OpenGL library for rendering 2D and 3D graphics on a display), database libraries (for example, SQLite or other relational database functions), and web libraries (for example, WebKit that may provide web browsing functionality). The libraries 716 may also include a wide variety of other libraries 738 to provide many functions for applications 720 and other software modules.

The frameworks 718 (also sometimes referred to as middleware) provide a higher-level common infrastructure that may be used by the applications 720 and/or other software modules. For example, the frameworks 718 may provide various graphic user interface (GUI) functions, high-level resource management, or high-level location services. The frameworks 718 may provide a broad spectrum of other APIs for applications 720 and/or other software modules.

The applications 720 include built-in applications 740 and/or third-party applications 742. Examples of built-in applications 740 may include, but are not limited to, a contacts application, a browser application, a location application, a media application, a messaging application, and/or a game application. Third-party applications 742 may include any applications developed by an entity other than the vendor of the particular platform. The applications 720 may use functions available via OS 714, libraries 716, frameworks 718, and presentation layer 744 to create user interfaces to interact with users.

Some software architectures use virtual machines, as illustrated by a virtual machine 748. The virtual machine 748 provides an execution environment where applications/modules can execute as if they were executing on a hardware machine (such as the machine 800 of FIG. 8, for example). The virtual machine 748 may be hosted by a host OS (for example, OS 714) or hypervisor, and may have a virtual machine monitor 746 which manages operation of the virtual machine 748 and interoperation with the host operating system. A software architecture, which may be different from software architecture 702 outside of the virtual machine, executes within the virtual machine 748 such as an OS 750, libraries 752, frameworks 754, applications 756, and/or a presentation layer 758.

Figure 8:
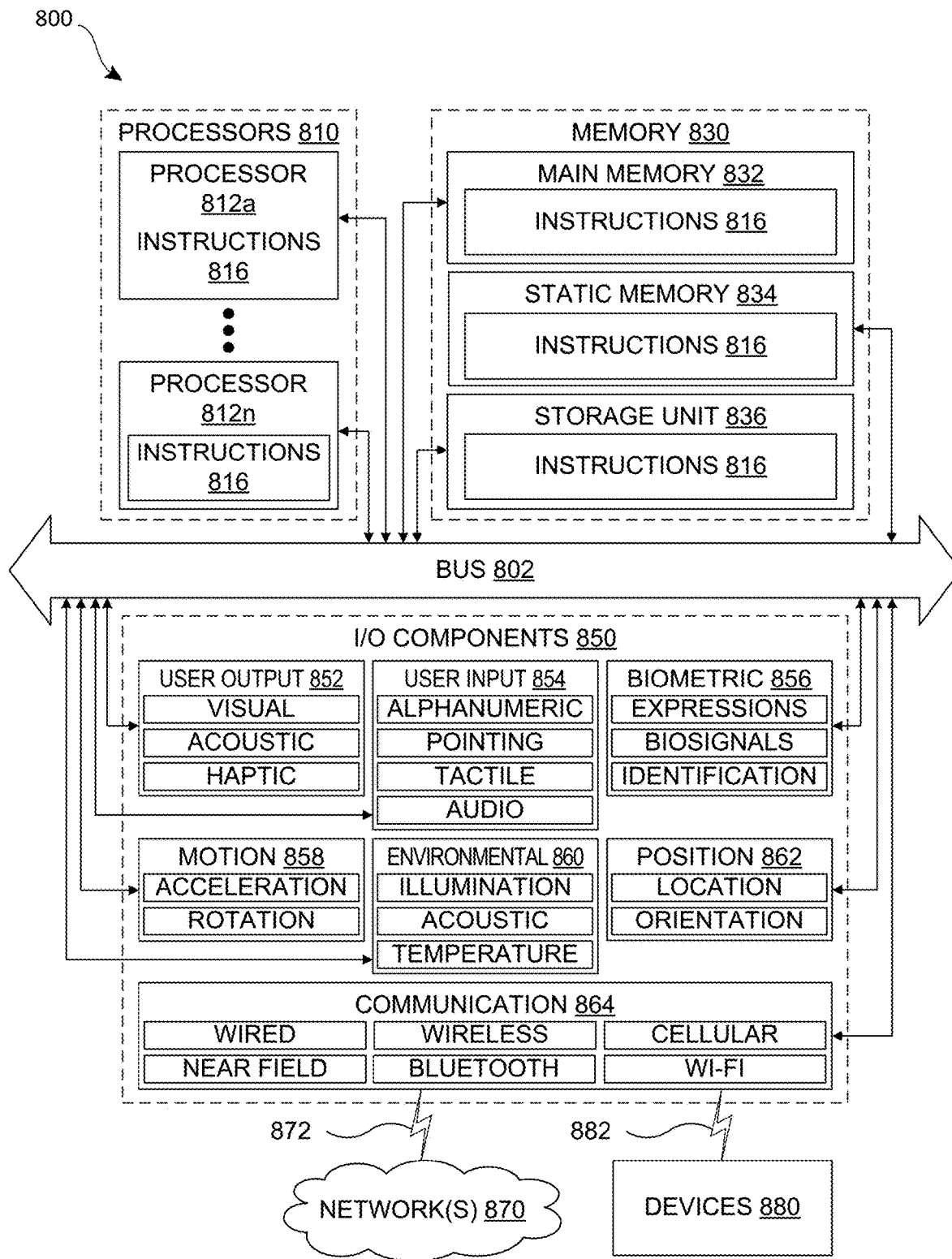
FIG. 8 is a block diagram showing components of an example machine configured to read instructions from a machine-readable medium and perform any of the features described herein.

FIG. 8 is a block diagram illustrating components of an example machine 800 configured to read instructions from a machine-readable medium (for example, a machine-readable storage medium) and perform any of the features described herein. The example machine 800 is in a form of a computer system, within which instructions 816 (for example, in the form of software components) for causing the machine 800 to perform any of the features described herein may be executed. As such, the instructions 816 may be used to implement modules or components described herein. The instructions 816 cause unprogrammed and/or unconfigured machine 800 to operate as a particular machine configured to carry out the described features. The machine 800 may be configured to operate as a standalone device or may be coupled (for example, networked) to other machines. In a networked deployment, the machine 800 may operate in the capacity of a server machine or a client machine in a server-client network environment, or as a node in a peer-to-peer or distributed network environment. Machine 800 may be embodied as, for example, a server computer, a client computer, a personal computer (PC), a tablet computer, a laptop computer, a netbook, a set-top box (STB), a gaming and/or entertainment system, a smart phone, a mobile device, a wearable device (for example, a smart watch), and an Internet of Things (IoT) device. Further, although only a single machine 800 is illustrated, the term "machine" includes a collection of machines that individually or jointly execute the instructions 816.

The machine 800 may include processors 810, memory 830, and I/O components 850, which may be communicatively coupled via, for example, a bus 802. The bus 802 may include multiple buses coupling various elements of machine 800 via various bus technologies and protocols. In an example, the processors 810 (including, for example, a central processing unit (CPU), a graphics processing unit (GPU), a digital signal processor (DSP), an ASIC, or a suitable combination thereof) may include one or more processors 812a to 812n that may execute the instructions 816 and process data. In some examples, one or more processors 810 may execute instructions provided or identified by one or more other processors 810. The term "processor" includes a multi-core processor including cores that may execute instructions contemporaneously. Although FIG. 8 shows multiple processors, the machine 800 may include a single processor with a single core, a single processor with multiple cores (for example, a multi-core processor), multiple processors each with a single core, multiple processors each with multiple cores, or any combination thereof. In some examples, the machine 800 may include multiple processors distributed among multiple machines.

The memory/storage 830 may include a main memory 832, a static memory 834, or other memory, and a storage unit 836, both accessible to the processors 810 such as via the bus 802. The storage unit 836 and memory 832, 834 store instructions 816 embodying any one or more of the functions described herein. The memory/storage 830 may also store temporary, intermediate, and/or long-term data for processors 810. The instructions 816 may also reside, completely or partially, within the memory 832, 834, within the storage unit 836, within at least one of the processors 810 (for example, within a command buffer or cache memory), within memory at least one of I/O components 850, or any suitable combination thereof, during execution thereof. Accordingly, the memory 832, 834, the storage unit 836, memory in processors 810, and memory in I/O components 850 are examples of machine-readable media.

As used herein, "machine-readable medium" refers to a device able to temporarily or permanently store instructions and data that cause machine 800 to operate in a specific fashion, and may include, but is not limited to, random-access memory (RAM), read-only memory (ROM), buffer memory, flash memory, optical storage media, magnetic storage media and devices, cache memory, network-accessible or cloud storage, other types of storage and/or any suitable combination thereof. The term "machine-readable medium" applies to a single medium, or combination of multiple media, used to store instructions (for example, instructions 816) for execution by a machine 800 such that the instructions, when executed by one or more processors 810 of the machine 800, cause the machine 800 to perform and one or more of the features described herein. Accordingly, a "machine-readable medium" may refer to a single storage device, as well as "cloud-based" storage systems or storage networks that include multiple storage apparatus or devices. The term "machine-readable medium" excludes signals per se.

The I/O components 850 may include a wide variety of hardware components adapted to receive input, provide output, produce output, transmit information, exchange information, capture measurements, and so on. The specific I/O components 850 included in a particular machine will depend on the type and/or function of the machine. For example, mobile devices such as mobile phones may include a touch input device, whereas a headless server or IoT device may not include such a touch input device. The particular examples of I/O components illustrated in FIG. 8 are in no way limiting, and other types of components may be included in machine 800. The grouping of I/O components 850 are merely for simplifying this discussion, and the grouping is in no way limiting. In various examples, the I/O components 850 may include user output components 852 and user input components 854. User output components 852 may include, for example, display components for displaying information (for example, a liquid crystal display (LCD) or a projector), acoustic components (for example, speakers), haptic components (for example, a vibratory motor or force-feedback device), and/or other signal generators. User input components 854 may include, for example, alphanumeric input components (for example, a keyboard or a touch screen), pointing components (for example, a mouse device, a touchpad, or another pointing instrument), and/or tactile input components (for example, a physical button or a touch screen that provides location and/or force of touches or touch gestures) configured for receiving various user inputs, such as user commands and/or selections.

In some examples, the I/O components 850 may include biometric components 856, motion components 858, environmental components 860, and/or position components 862, among a wide array of other physical sensor components. The biometric components 856 may include, for example, components to detect body expressions (for example, facial expressions, vocal expressions, hand or body gestures, or eye tracking), measure biosignals (for example, heart rate or brain waves), and identify a person (for example, via voice-, retina-, fingerprint-, and/or facial-based identification). The motion components 858 may include, for example, acceleration sensors (for example, an accelerometer) and rotation sensors (for example, a gyroscope). The environmental components 860 may include, for example, illumination sensors, temperature sensors, humidity sensors, pressure sensors (for example, a barometer), acoustic sensors (for example, a microphone used to detect ambient noise), proximity sensors (for example, infrared sensing of nearby objects), and/or other components that may provide indications, measurements, or signals corresponding to a surrounding physical environment. The position components 862 may include, for example, location sensors (for example, a Global Position System (GPS) receiver), altitude sensors (for example, an air pressure sensor from which altitude may be derived), and/or orientation sensors (for example, magnetometers).

The I/O components 850 may include communication components 864, implementing a wide variety of technologies operable to couple the machine 800 to network(s) 870 and/or device(s) 880 via respective communicative couplings 872 and 882. The communication components 864 may include one or more network interface components or other suitable devices to interface with the network(s) 870.

The communication components 864 may include, for example, components adapted to provide wired communication, wireless communication, cellular communication, Near Field Communication (NFC), Bluetooth communication, Wi-Fi, and/or communication via other modalities. The device(s) 880 may include other machines or various peripheral devices (for example, coupled via USB).

In some examples, the communication components 864 may detect identifiers or include components adapted to detect identifiers. For example, the communication components 864 may include Radio Frequency Identification (RFID) tag readers, NFC detectors, optical sensors (for example, one- or multi-dimensional bar codes, or other optical codes), and/or acoustic detectors (for example, microphones to identify tagged audio signals). In some examples, location information may be determined based on information from the communication components 862, such as, but not limited to, geo-location via Internet Protocol (IP) address, location via Wi-Fi, cellular, NFC, Bluetooth, or other wireless station identification and/or signal triangulation.

In the preceding detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high-level, without detail, in order to avoid unnecessarily obscuring aspects of the present teachings.

While various embodiments have been described, the description is intended to be exemplary, rather than limiting, and it is understood that many more embodiments and implementations are possible that are within the scope of the embodiments. Although many possible combinations of features are shown in the accompanying figures and discussed in this detailed description, many other combinations of the disclosed features are possible. Any feature of any embodiment may be used in combination with or substituted for any other feature or element in any other embodiment unless specifically restricted. Therefore, it will be understood that any of the features shown and/or discussed in the present disclosure may be implemented together in any suitable combination. Accordingly, the embodiments are not to be restricted except in light of the attached claims and their equivalents. Also, various modifications and changes may be made within the scope of the attached claims.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that the claims require more features than are expressly recited in each claim. Rather, as the following claims reflect, inventive subject matter lies in less than all features of a single disclosed example. Thus, the following claims are hereby incorporated into the Detailed Description, with each claim standing on its own as a separately claimed subject matter.

What is claimed is:

1. A data processing system comprising:
   a processor; and
   a machine-readable medium storing executable instructions that, when executed, cause the processor to perform operations comprising:
   receiving textual content from a first application on a first client device associated with a first user for analysis by a context adaptive writing assistant configured to provide suggestions for improving the textual content;
   obtaining, from a plurality of data sources, contextual information indicative of a level of formality of the textual content, the contextual information including information identifying an intended audience of the textual content, and wherein obtaining the contextual information further comprises obtaining user graph information that represents relationships between the first user and users of the intended audience, the user graph information being derived from previous communications between the first user and the users of the intended audience;

categorizing the textual content as being associated with a first level of formality selected from a plurality of levels of formality based on the contextual information by providing the textual content and the contextual information as an input to a first machine learning model, the first machine learning model being trained to analyze the textual content and the contextual information to determine a predicted level of formality associated with the textual content and to output an indication of the predicted level of formality;

analyzing the textual content to identify one or more suggested improvements to the textual content;

selecting a subset of suggested improvements from the one or more suggested improvements to the textual content to the first user based on the first level of formality associated with the textual content;

sending the subset of suggested improvements to the first client device; and causing the first client device to display the subset of suggested improvements in the first application on the first client device.

2. The data processing system of claim 1, wherein the machine-readable medium includes instructions configured to cause the processor to perform operations of:

receiving feedback from the first client device that the textual content has been misclassified and should not associated with the first level of formality; and fine tuning performance of the first machine learning model based on the feedback.

3. The data processing system of claim 1, wherein analyzing the textual content to identify one or more suggested improvements to the textual content further comprises:

analyzing the textual content to identify suggested improvements related to one or more of spelling errors, grammatical errors, punctuation errors, and capitalization errors.

4. The data processing system of claim 1, wherein obtaining the contextual information further comprises:

obtaining user preference information indicating which types of suggested improvements the first user is interested in receiving.

5. The data processing system of claim 1, wherein obtaining the contextual information further comprises:

obtaining a custom dictionary associated with the first user that includes words added by the first user for checking spelling in the textual content.

6. The data processing system of claim 1, wherein the machine-readable medium includes instructions configured to cause the processor to perform operations of:

obtaining user historical behavior associated with the textual content; and ranking a set of terms associated with a first suggested improvement of the subset of suggested improvements based on the user historical behavior.

7. The data processing system of claim 1, wherein the machine-readable medium includes instructions configured to cause the processor to perform operations of:

causing the first client device to display an indication that the context adaptive writing assistant is operating in a first mode associated with the first level of formality.

8. The data processing system of claim 7, wherein the machine-readable medium includes instructions configured to cause the processor to perform operations of:

receiving updated textual content from the first application on the first client device;

categorizing the updated textual content as being associated with a second level of formality selected from a plurality of levels of formality based on the contextual information; and causing the first client device to display the indication that the context adaptive writing assistant is operating in a second mode associated with the second level of formality.

9. A data processing system comprising:

a processor; and a machine-readable medium storing executable instructions that, when executed, cause the processor to perform operations comprising:

receiving textual content from a first application of a first client device associated with a first user and contextual information identifying an intended audience of the textual content;

sending the textual content to a context adaptive writing assistant for analysis, the context adaptive writing assistant being configured to obtain user graph information that represents relationships between the first user and users of the intended audience, the user graph information being derived from previous communications between the first user and the users of the intended audience, the context adaptive writing assistant being further configured to determine a first level of formality associated with the textual content based at least in part on the users of the intended audience;

receiving suggested improvements to the textual content from the context adaptive writing assistant and a first indication that the context adaptive writing assistant is operating in a first mode associated with the first level of formality associated with the textual content;

causing the first client device to display the first indication that the context adaptive writing assistant is operating in the first mode associated with the first level of formality, the first indication comprising a control for providing feedback to the data processing system that the context adaptive writing assistant has misclassified the textual content and should be operating in a second mode associated with a second level of formality; and causing the first client device to display the suggested improvements to the textual content in the first application.

10. The data processing system of claim 9, wherein the machine-readable medium includes instructions configured to cause the processor to perform operations of:

receiving the feedback at the first client device that the textual content has been misclassified and should not associated with the first level of formality; and sending the feedback to the context adaptive writing assistant to fine tune performance of a classification model used to determine a level of formality associated with the textual content.

11. Data processing system of claim 10, wherein the machine-readable medium includes instructions configured to cause the processor to perform operations of:

receiving updated textual content from the first application on the first client device;

sending the updated textual content to the context adaptive writing assistant for analysis;

receiving, from the context adaptive writing assistant, a second indication that the context adaptive writing assistant is operating in the second mode associated with the second level of formality associated with the updated textual content; and causing the first client device to display the second indication that the context adaptive writing assistant is operating in the second mode associated with the second level of formality.

12. A method implemented in a data processing system for providing suggestions for improving textual content, the method comprising:

receiving the textual content from a first application on a first client device associated with a first user;

obtaining, from a plurality of data sources, contextual information indicative of a level of formality of the textual content, the contextual information including information identifying an intended audience of the textual content, and wherein obtaining the contextual information further comprises obtaining user graph information that represents relationships between the first user and users of the intended audience, the user graph information being derived from previous communications between the first user and the users of the intended audience;

categorizing the textual content as being associated with a first level of formality selected from a plurality of levels of formality based on the contextual information by providing the textual content and the contextual information as an input to a first machine learning model, the first machine learning model being trained to analyze the textual content and the contextual information to determine a predicted level of formality associated with the textual content and to output an indication of the predicted level of formality;

analyzing the textual content to identify one or more suggested improvements to the textual content;

selecting a subset of suggested improvements from the one or more suggested improvements to the textual content to the first user based on the first level of formality associated with the textual content;

sending the subset of suggested improvements to the first client device; and causing the first client device to display the subset of suggested improvements in the first application on the first client device.

13. The method of claim 12, further comprising:

receiving feedback from the first client device that the textual content has been misclassified and should not associated with the first level of formality; and fine tuning performance of the first machine learning model based on the feedback.

14. The method of claim 12, wherein analyzing the textual content to identify one or more suggested improvements to the textual content further comprises:

analyzing the textual content to identify suggested improvements related to one or more of spelling errors, grammatical errors, punctuation errors, and capitalization errors.

15. The method of claim 12, wherein obtaining the contextual information further comprises:

obtaining user preference information indicating which types of suggested improvements the first user is interested in receiving.

16. The method of claim 12, wherein obtaining the contextual information further comprises:

obtaining a custom dictionary associated with the first user that includes words added by the first user for checking spelling in the textual content.

17. The method of claim 12, further comprising:

causing the first client device to display an indication that the textual content associated with the first level of formality.

18. The method of claim 17, further comprising:

receiving updated textual content from the first application on the first client device;

categorizing the updated textual content as being associated with a second level of formality selected from a plurality of levels of formality based on the contextual information; and causing the first client device to display the indication that the updated textual content is associated with the second level of formality.

* * * * *